(12) United States Patent
McCurter

(10) Patent No.: US 11,318,801 B1
(45) Date of Patent: May 3, 2022

(54) TOWING COUPLER WITH COUPLER CLOSER

(71) Applicant: Premier Equipment, Inc., Tualatin, OR (US)

(72) Inventor: Zachery D. McCurter, Portland, OR (US)

(73) Assignee: Premier Equipment, Inc., Tualatin, OR (US)

( * ) Notice: Subject to any disclaimer, the term of this patent is extended or adjusted under 35 U.S.C. 154(b) by 479 days.

(21) Appl. No.: 16/400,964

(22) Filed: May 1, 2019

Related U.S. Application Data

(63) Continuation-in-part of application No. 16/398,849, filed on Apr. 30, 2019.

(60) Provisional application No. 62/812,141, filed on Feb. 28, 2019, provisional application No. 62/670,189, filed on May 11, 2018.

(51) Int. Cl.
*B60D 1/24* (2006.01)
*B60D 1/04* (2006.01)

(52) U.S. Cl.
CPC .............. *B60D 1/246* (2013.01); *B60D 1/04* (2013.01)

(58) Field of Classification Search
CPC ........ B60D 1/04; B60D 1/246; A01B 59/042; F16B 45/02
See application file for complete search history.

(56) References Cited

U.S. PATENT DOCUMENTS

| | | | | |
|---|---|---|---|---|
| 2,426,532 A | * | 8/1947 | Tierney | B60D 1/04 280/504 |
| 2,766,995 A | * | 10/1956 | Weiss | B60D 1/04 280/504 |
| 2,842,380 A | * | 7/1958 | Weiss | B60D 1/04 280/504 |
| 3,475,037 A | * | 10/1969 | Weiss | B60D 1/04 280/504 |
| 4,014,562 A | * | 3/1977 | Kunze | B60D 1/04 280/508 |
| 4,071,263 A | * | 1/1978 | Kunze | A01B 59/006 280/508 |

(Continued)

OTHER PUBLICATIONS

Premier Manufacturing Co., Couplings/Pintle Hitches, https://www.premier-mfg.com/products/coupling, 10 pages, (printed Oct. 3, 2019).

(Continued)

*Primary Examiner* — Kevin Hurley
*Assistant Examiner* — Michael R Stabley
(74) *Attorney, Agent, or Firm* — Klarquist Sparkman, LLP

(57) ABSTRACT

A coupler for use by a towing vehicle to tow a towed vehicle can have an auxiliary actuator, such as a pneumatic or hydraulic cylinder, coupled to a coupler latching element or elements to move the latching elements to a closed position, such as automatically in response to the occurrence of a vehicle condition, such as the release of the emergency brake of a towing vehicle. The auxiliary actuator can be provided with or without a actuator used to move a clamp into engagement with a draw bar eye of the towed vehicle. The auxiliary actuator can operate to cause the closing of the latching element or elements when, for example, a vehicle operator inadvertently forgets to close the latch before driving off with a towed trailer.

18 Claims, 25 Drawing Sheets

(56) References Cited

U.S. PATENT DOCUMENTS

| | | | | |
|---|---|---|---|---|
| 4,108,464 | A | * | 8/1978 | von Allworden .... A01B 59/006 280/508 |
| 4,157,838 | A | * | 6/1979 | von Allworden .... A01B 59/006 280/508 |
| 4,434,996 | A | * | 3/1984 | Wallace .................. B60D 1/07 280/504 |
| 4,492,386 | A | * | 1/1985 | Roberts .................. B60D 1/04 24/600.1 |
| 4,721,324 | A | * | 1/1988 | Blacklaw ................ B60D 1/04 280/504 |
| 4,758,015 | A | * | 7/1988 | Pixley .................... B60D 1/04 280/504 |
| 4,958,848 | A | * | 9/1990 | Nash ....................... B60D 1/04 280/504 |
| 5,332,250 | A | * | 7/1994 | Thorwall ................ B60D 1/04 280/507 |
| 5,441,117 | A | * | 8/1995 | Fartmann ............ A01B 59/006 172/272 |
| 5,497,835 | A | * | 3/1996 | Laubner .................. B60D 1/04 172/272 |
| 7,225,883 | B2 | * | 6/2007 | Yamada ............... A01B 59/006 172/272 |
| 7,431,321 | B2 | * | 10/2008 | Terpsma .................. B60D 1/04 138/145 |
| 7,815,212 | B2 | * | 10/2010 | Groshong ................ B60D 1/28 280/514 |
| 8,684,391 | B2 | * | 4/2014 | Szczepanek ............. B60D 1/04 280/504 |
| 9,108,478 | B2 | | 8/2015 | Grycko et al. |
| 2005/0115723 | A1 | * | 6/2005 | Ollefs ...................... B60D 1/04 172/439 |
| 2012/0298387 | A1 | * | 11/2012 | Sauermann ............ B60D 1/141 172/272 |
| 2016/0075197 | A1 | | 3/2016 | Coleman et al. |

OTHER PUBLICATIONS

Premier Manufacturing Co., 2880 Slack Reducing Coupling, https://www.premier-mfg.com/products/couplings/2880-slack-reducing-coupling, 10 pages (revised Mar. 2015).

Premier Manufacturing Co., 270 Coupling, https://www.premier-mfg.com/images/uploads/product_pdfs/270_Coupling_Installation_Guide.pdf, 10 pages (revised Oct. 2009).

* cited by examiner

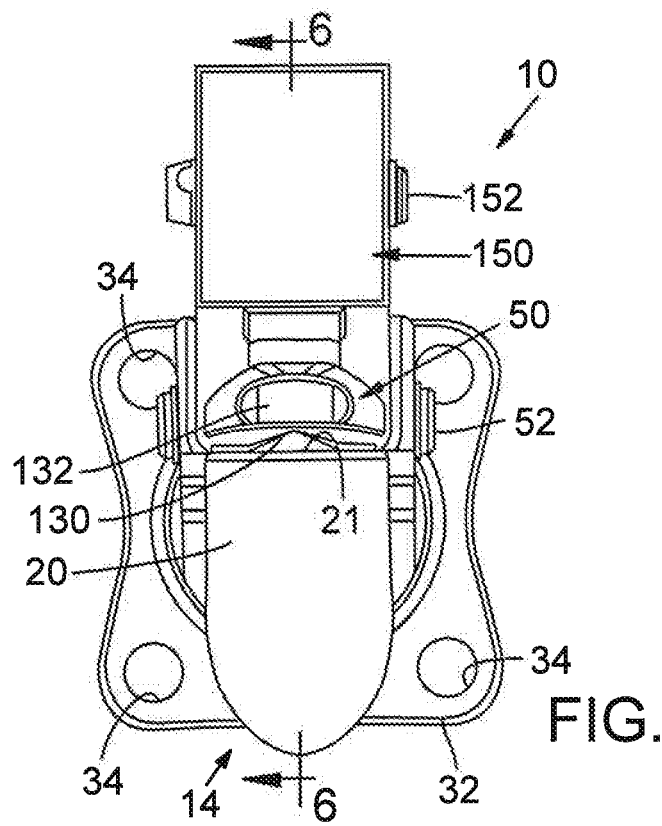
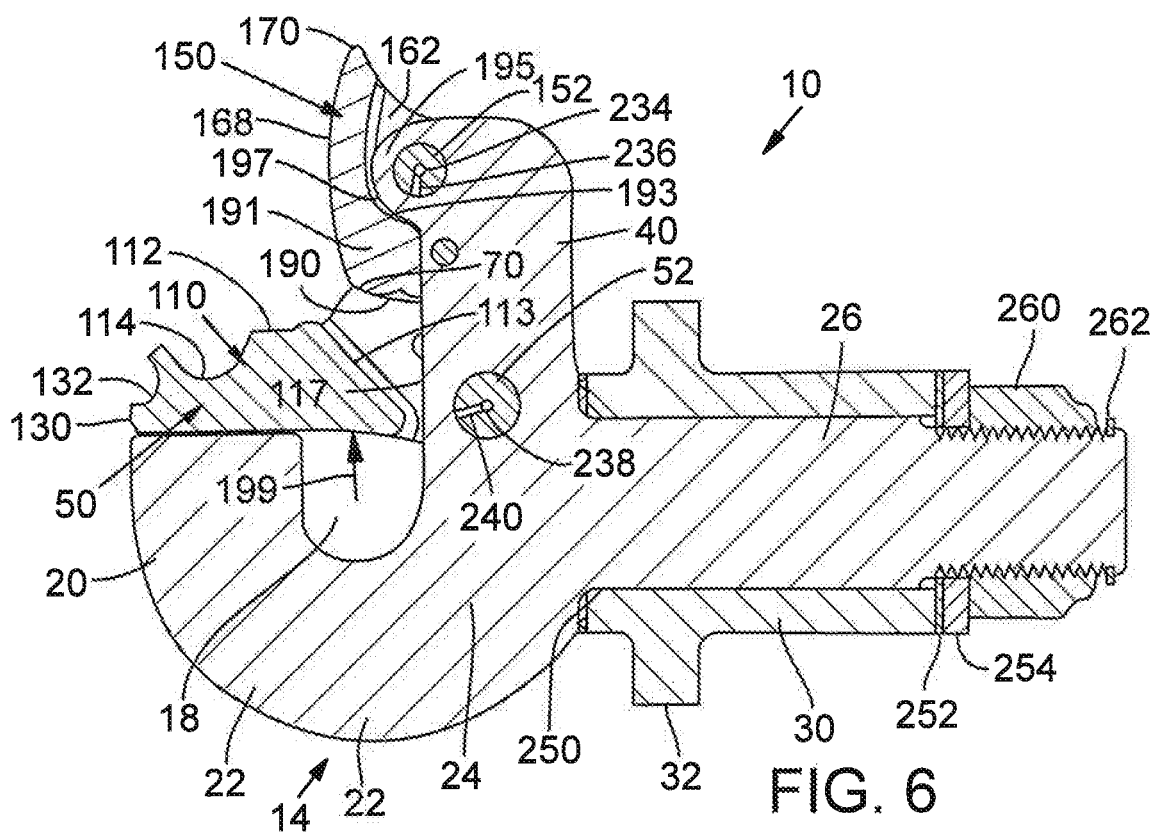

TOWING COUPLER WITH COUPLER CLOSER

CROSS REFERENCE TO RELATED APPLICATION

This application claims the benefit of U.S. Provisional Application Ser. No. 62/812,141, entitled TOWING COUPLER WITH COUPLER CLOSER, filed on Feb. 28, 2019, which is incorporated by reference herein. This application is a continuation in part of U.S. patent application Ser. No. 16/398,849, entitled TOWING COUPLER, filed on Apr. 30, 2019, which is incorporated by reference herein. This application also claims the benefit of U.S. Provisional Application Ser. No. 62/670,189, entitled TOWING COUPLER, filed on May 11, 2018, which is incorporated by reference herein.

FIELD

This disclosure relates to towing couplers and more specifically to towing couplers for land vehicles for use in engaging a hitch mechanism, such as a draw bar of a vehicle, such as a trailer, to be towed.

SUMMARY

In accordance with an aspect of this disclosure, the coupler includes a coupler housing or body that is designed for mounting to a towing vehicle. The coupler body comprises a hook portion with a draw bar receiving opening and a latch that is operable to close the draw bar receiving opening. The latch comprises at least one movable latching element that is movable from an open position to a closed position. In a desirable form, the latch comprises plural latching elements that cooperate with one another to close the draw bar receiving opening. When the latching elements are in the open position, the latch element allows the positioning of a towing element, such as a draw bar eye of the draw bar on the hook portion. When the latching element is in the closed position, the draw bar opening is closed sufficiently to restrict passage of the draw bar or other towing element from the hook and away from the towing vehicle.

In accordance with another aspect the coupler can comprise a lever pivoted to the coupler body and a first actuator, such as a pneumatic or hydraulic cylinder, that is operable in response to releasing an emergency brake of the towing vehicle to move the lever to a position engaging a draw bar positioned on the hook.

In accordance with another aspect, the coupler can have an auxiliary actuator, such as a pneumatic or hydraulic cylinder, coupled to the latching element or elements to move the latching elements to the closed position, such as automatically in response to the release of the emergency brake of a towing vehicle. The auxiliary actuator can be provided with or without the first actuator and can operate to close the latching element or elements when, for example, a vehicle operator inadvertently forgets to close the latch before driving off with a towed trailer.

In accordance with an embodiment, a towing coupler for a vehicle can comprise: a body comprising a hook portion having a hook opening and a latch supporting portion; at least one latch coupled to the latch supporting portion and pivotal about a latch pivot axis between latch open and latch closed positions, whereby in the latch closed position a draw bar eye is blocked from passage through the hook opening and whereby in the latch open position passage of a draw bar eye through the hook opening is not blocked; and an actuator coupled to the at least one latch and operable to cause the at least one latch to pivot to the closed position in response to one or more vehicle conditions.

As an aspect, the one or more vehicle conditions, or at least one vehicle condition, can include at least one of turning on the ignition of the vehicle, starting the vehicle engine, placing the vehicle in a gear other than park or neutral, movement of the vehicle, or the release of parking brakes of the vehicle.

As another aspect, a towing coupler for a vehicle can comprise an actuator that comprises a cylinder having a piston with a piston rod, the piston rod being coupled to the at least one latch, the cylinder being operated in response to the one or more vehicle conditions to cause the at least one latch to pivot to the latch closed position in response to the occurrence of the one or more vehicle conditions or at least one vehicle condition. The cylinder can comprise a pneumatic cylinder that is adapted for coupling to an air supply line for parking brakes of the vehicle, the cylinder being pressurized to extend the piston to pivot the at least one latch to the latch closed position in response to the release of the vehicle parking brakes.

As further aspects, the at least one latch can comprise a first latch and a second latch; wherein the first latch is pivoted to the latch supporting portion and pivotal about a first latch pivot axis between first latch open and first latch closed positions, whereby in the first latch closed position a draw bar eye is blocked from passage through the hook opening and whereby in the first latch open position passage of a draw bar eye through the hook opening is not blocked, the first latch comprising upwardly facing first and second latch engaging surfaces, the first latch engaging surface being spaced further from the first latch pivot axis than the second latch engaging surface; a first spring coupled to the body and to the first latch and biasing the first latch to pivot about the first latch pivot axis in a first direction and away from the first latch closed position; a second latch pivoted to the latch supporting portion and pivotal about a second latch pivot axis, the second latch being pivotal about the second latch pivot axis between a second latch first position and a second latch second position, wherein in the second latch first position and with the first latch in the first latch open position, the second latch is coupled at least partially to the first latch engaging surface, and wherein in the second latch second position and with the first latch in the first latch closed position, the second latch is coupled at least partially to the second latch engaging surface; a second spring coupled to the body and to the second latch and biasing the second latch to pivot about the second latch pivot axis in a second direction opposite to the first direction, the second spring pivoting the second latch to the second latch second position upon pivoting of the first latch from the first latch open position toward the first latch closed position; and wherein the piston rod is coupled to the first latch and operates to pivot the first latch to the first latch closed position in response to the occurrence of the one or more vehicle conditions.

As an additional aspect, a pawl can be pivoted to the body and coupled to the second latch and adapted to engage and retain the second latch in the second latch second position while the first latch is in the first latch closed position and until the first latch is pivoted to the first latch open position.

As still further aspects, a towing coupler can comprise a lever pivoted to the body and positioned for pivoting between clamped and unclamped positions, whereby in the clamped position the lever is adapted for engaging a draw bar eye positioned on the hook portion and in the unclamped position the lever is adapted to disengage the draw bar eye positioned on the hook portion; a spring biasing the lever to the unclamped position; wherein the piston rod is coupled to the lever and is adapted to pivot the lever to the clamped position in response to the occurrence of the at least one vehicle condition; a mechanical link pivoted to the body and coupled to the first latch, the mechanical link being pivotal between first and second link positions, a spring biasing the mechanical link to the second link position, the mechanical link being coupled to the first latch to pivot the first latch to the first latch closed position upon pivoting the mechanical link to the first link position, the piston being coupled to the mechanical link and pivoting the mechanical link to the first link position to thereby pivot the first latch to the first latch closed position upon pivoting the lever by the piston to the clamped position. The at least one vehicle condition can be the release of the vehicle parking brakes and wherein the cylinder is a pneumatic cylinder.

As additional aspects, the towing coupler can comprise a first or auxiliary cylinder having a first piston and a first piston rod, a lever pivoted to the body and positioned for pivoting movement between clamped and unclamped positions, whereby in the clamped position the lever is adapted for coupling to a draw bar eye positioned on the hook portion and in the unclamped position the lever is decoupled from a draw bar eye positioned on the hook portion; a second cylinder comprising a second piston and second piston rod, the second piston rod being coupled to the lever to pivot the lever to the clamped position in response to the occurrence of the at least one vehicle condition. Each of the first and second cylinders can comprise pneumatic cylinders adapted for coupling to an air supply line for parking brakes of the vehicle and the at least one vehicle condition can comprise or be the release of the vehicle parking brakes.

As a further aspect, a first actuator can be coupled to the at least one latch and can be adapted to pivot the at least one latch to the closed position in response to one or more vehicle conditions; a lever can be pivoted to the body and positioned for pivoting movement between clamped and unclamped positions, whereby in the clamped position the lever is adapted for coupling to a draw bar eye positioned on the hook portion and in the unclamped position the lever is decoupled from a draw bar eye positioned on the hook portion; in addition, a second actuator can be coupled to the lever and adapted to pivot the lever to the clamped position in response to the one or more vehicle conditions. The at least one least one vehicle condition can be the release of parking brakes of a vehicle, the first and second actuators can comprise respective first and second pneumatic cylinders. The first cylinder can have a first piston coupled to the at least one latch and can be adapted for coupling to an air supply line for the parking brakes of the vehicle, the first piston rod being extended to pivot the latch to the latch closed position in response to a release of the parking brakes. In addition, the second cylinder can have a second piston coupled to lever and adapted for coupling to the air supply line for the parking brakes of the vehicle, the second piston rod being extended to pivot the lever to the clamped position in response to the release of the parking brakes of the vehicle.

As additional aspects, a towing coupler for a vehicle can comprise a body comprising a hook portion having a hook opening and a latch supporting portion; a first latch pivoted to the latch supporting portion and pivotal about a first latch pivot axis between first latch open and first latch closed positions, the first latch comprising first and second latch engaging surfaces; a first spring coupled to the body and to the first latch and biasing the first latch to pivot about the first latch pivot axis in a first direction and away from the first latch closed position; a second latch pivoted to the latch supporting portion and pivotal about a second latch pivot axis, the second latch being pivotal about the second latch pivot axis between a second latch first position and a second latch second position, wherein in the second latch first position and with the first latch in the first latch open position, the second latch is coupled at least partially to the first latch engaging surface, and wherein in the second latch second position and with the first latch in the first latch closed position, the second latch is coupled at least partially to the second latch engaging surface; a second spring coupled to the body and to the second latch and biasing the second latch to pivot about the second latch pivot axis in a second direction opposite to the first direction, the second spring pivoting the second latch to the second latch second position upon pivoting of the first latch from the first latch open position toward the first latch closed position; a cylinder adapted to respond to the release of the parking brakes of the vehicle, the cylinder comprising a piston with a piston rod, the piston rod being coupled to the first latch, the piston rod extending in response to the release of the parking brakes to pivot the first latch to the first latch closed position. The cylinder can be adapted for coupling to a parking brake air supply line of the vehicle that is pressurized upon release of the parting brakes, the piston extending in response to pressurization of the parking brake air supply line, the cylinder further comprising a return spring biasing the piston from the extended position to a retracted position and causing the piston to travel to the retracted position upon the relief of pressure in the parking brake supply line. The cylinder can comprise a first or auxiliary cylinder with a first piston and a first piston rod; the towing coupler can also comprise a second or clamping cylinder comprising a second piston with a second piston and a second piston rod; a lever pivoted to the body and positioned for pivoting movement between clamped and unclamped position; the first cylinder adapted to respond to the release of the parking brakes of the vehicle, the first piston rod extending in response to the release of the parking brakes to pivot the first latch to the first latch closed position; and the second cylinder adapted to respond to the release of the parking brakes of the vehicle, the second piston rod extending in response to the release of the parking brakes to pivot the lever to the clamped position. The first cylinder can be adapted for coupling to a parking brake air supply line of the vehicle that is pressurized upon release of the parting brakes, the first piston extending in response to pressurization of the parking brake air supply line, the first cylinder further comprising a first return spring biasing the first piston from the extended position to a retracted position and causing the first piston to travel to the retracted position upon the relief of pressure in the parking brake supply line; and the second cylinder can be adapted for coupling to a parking brake air supply line of the vehicle that is pressurized upon release of the parking brakes, the second piston extending in response to pressurization of the parking brake air supply line, the second cylinder further comprising a second return spring biasing the second piston from the extended position to a retracted position and causing the second piston to travel to the retracted position upon the relief of pressure in the parking brake supply line.

As additional aspects, a towing coupler for a vehicle can comprise: a body comprising a hook portion having a hook opening and a latch supporting portion; a latch pivoted to the body and pivotal between latch open and latch closed positions; and means for pivoting the latch to the latch closed position in response to a vehicle condition. The means for closing the hook opening can comprise means for closing the hook opening in response to releasing an emergency brake of the vehicle. The towing coupler can also comprise means for clamping the draw bar eye of a vehicle when positioned on the hook portion in response to releasing the emergency brake of a vehicle.

This disclosure encompasses all possible combinations and sub-combinations of the above described aspects. In addition, although the description below proceeds with reference to a draw bar, this is not a limitation as it can be used with other towing elements, such as vehicle hitch mechanisms, designed for coupling to a coupler for towing.

BRIEF DESCRIPTION OF THE DRAWINGS

In FIG. 1, the first or lower latch is shown in an exemplary latch closed position and the second or upper latch is shown in an exemplary second latch position.

FIG. 5 is a front elevational view of the closed towing coupler of FIG. 1.

FIG. 6 is a vertical sectional view of the closed towing coupler of FIG. 5 taken along line 6-6 of FIG. 5.

In FIG. 7, the first or lower latch is shown in an exemplary first latch open position and the second or upper latch is shown in an exemplary second latch first position.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phrase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises" and the terms "including" and "having" have the same meaning as "comprising". The terms "upper" and "lower" are used for convenience in describing a towing coupler in the orientation of FIG. 1, it being understood that, for example, the upper latch in FIG. 1 will still be an upper latch even if the orientation of the towing coupler is changed to place the upper latch in a lower or lowest position from the position shown in FIG. 1.

Figure 1:
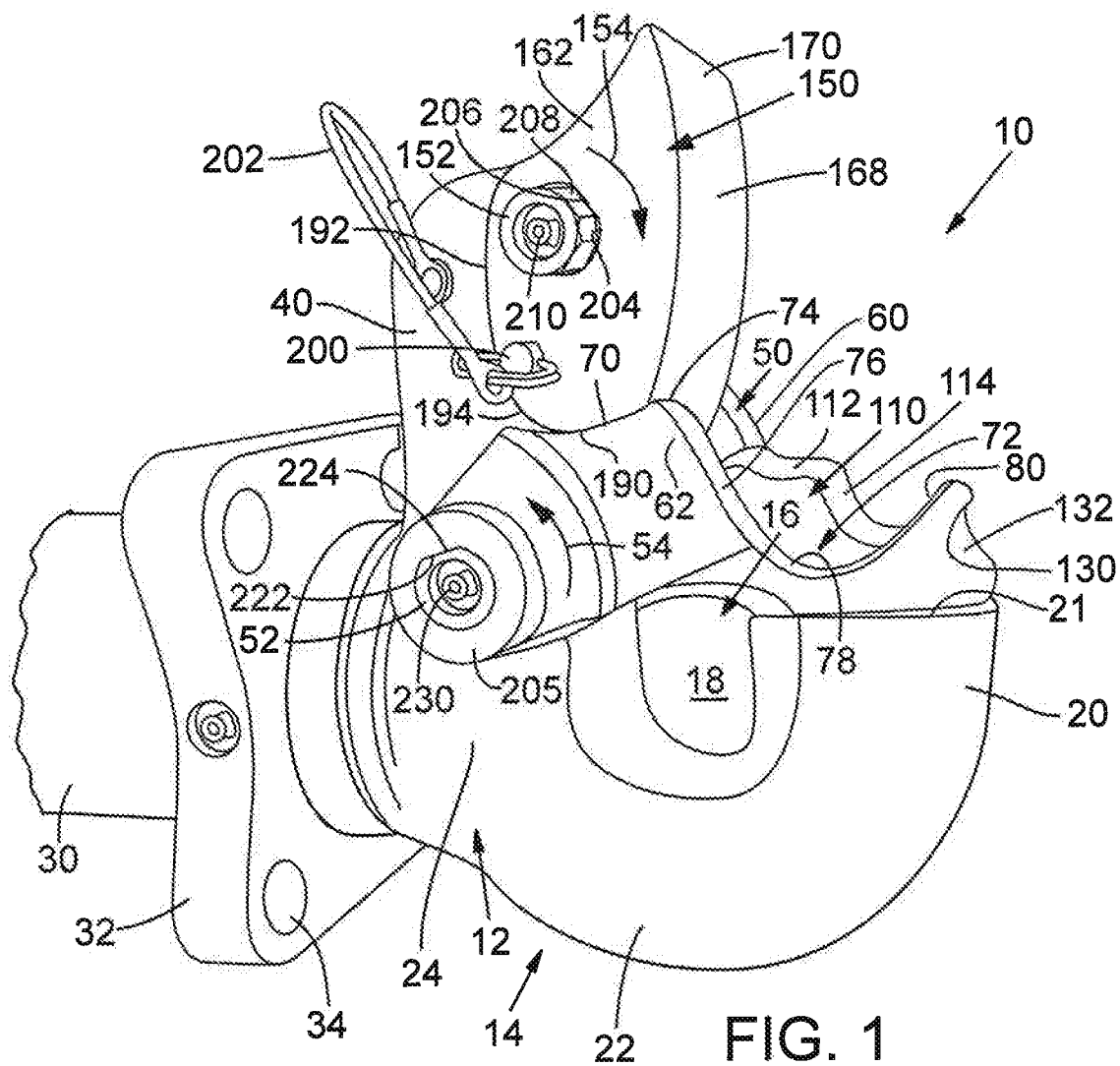
FIG. 1 is a left-side perspective view of an embodiment of a towing coupler in a closed state.

FIG. 1 illustrates an exemplary form of towing coupler or coupler 10 in accordance with this disclosure. Throughout this disclosure, the same numbers are used for common elements in the illustrated views of the coupler. The terms "parking brakes" or "parking brake" in this disclosure refers to the vehicle brakes that are typically applied when the vehicle is parked or not going to be moved. These parking brakes are sometimes called emergency brakes or parking/emergency brakes in this disclosure.

Referring to FIGS. 1-6, the coupler 10 comprises a body 12. The body 12 includes a hook portion 14 at a front portion of the body. The illustrated hook portion 14 comprises a hook which is open at the top 16 and that defines a draw bar eye receiving opening 18 therein. Specifically, the hook portion 14 includes an upwardly projecting front leg portion 20, a base portion 22 and a rear leg portion 24. The portions 20, 22 and 24 can be an inverted C-shaped configuration with the opening 18 positioned above section 22 and between the sections 20 and 24. A draw bar eye receiving space is provided between the leg portions and the base portion. The body also comprises a rearwardly extending housing 30 that surrounds a section of a shank portion 26 (FIG. 6) of the body 12. The housing 30 comprises a mounting structure or member for mounting the housing 30 and thereby the coupler to the framework of a land vehicle, such as a trailer. In FIG. 1, the mounting structure comprises a flange 32 with respective fastener receiving openings, one of which is indicated at 34, for receiving fasteners, such as bolts, that couple the mounting flange and thereby the coupler 10 to the trailer frame. The body 12 also comprises an upwardly extending latch supporting portion such as a column portion or column 40 projecting upwardly from the leg section 24.

Leg section 20 has an upper surface 21 that can have surface features formed therein, but more desirably is a flat or planar surface.

The illustrated coupler also comprises a lower latch portion 50, which comprises an exemplary form of a first latch, that is pivoted by a pivot pin 52 to a lower section of the column 40, such as above the leg section 24 of the hook portion 14. The pivot pin 52 defines a pivot axis that is desirably perpendicular to the longitudinal axis of the shank portion 26 of the body 12. Desirably the lower latch 50 is biased toward an open position, such as by one or more springs with torsion springs being a specific example. The lower latch is biased in a counter clockwise direction toward an open position in FIG. 1; as indicated by arrow 54 in FIG. 1. When viewed from the right side as in FIG. 2, the biasing force toward an open position is in a clockwise direction as indicated by arrow 55. The latch 50 comprises a proximal end portion adjacent to the column 40 and a distal end portion projecting away from the proximal end portion. The lower latch 50 can comprise spaced apart shoulder portions 60, 62 at the proximal end portion of the latch 50. The shoulder portions 60, 62 are respectively positioned in this example on opposite sides of the column 40. The pin 52 extends through shoulder portion 62, the column 40 and the shoulder portion 60; and is retained in place, such as by a snap ring 64, not shown in FIG. 1, but shown in FIG. 13.

Figure 2:
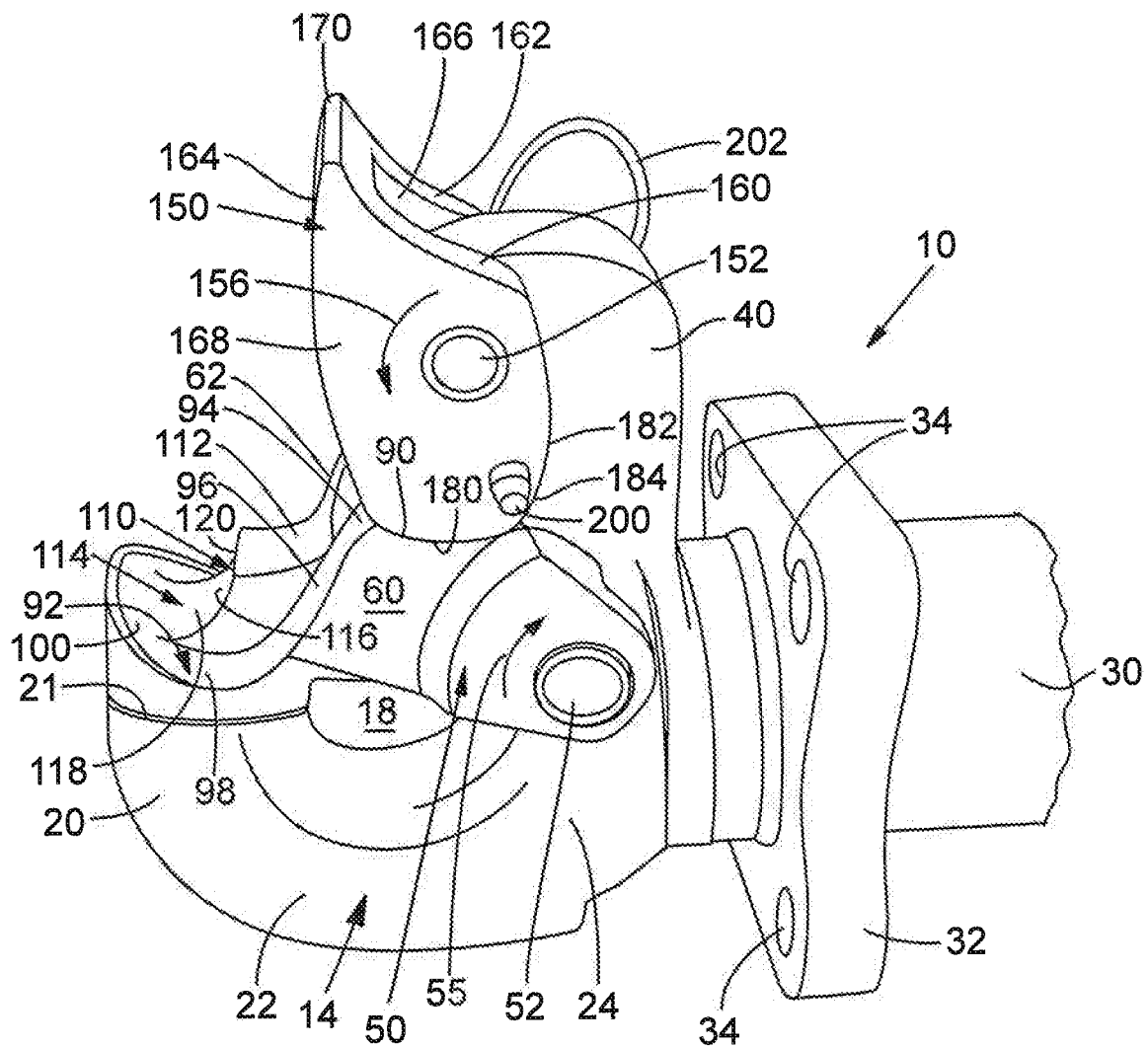
FIG. 2 is a right-side perspective view of the closed towing coupler of FIG. 1.

As can be seen in FIG. 1, when the coupler is closed, the latch 50 comprises an upwardly facing first latch engagement surface 70 and an upwardly facing second latch engagement surface 72. The surfaces 70, 72 are desirably at least partially or entirely concave and other engagement surfaces of the upper and lower latches are desirably at least partially or entirely concave. A ridge or peak 74 is positioned between the surfaces 70 and 72. The surfaces 70, 72 diverge moving downwardly away from the peak in the form shown. Similar surfaces at the opposite side of the latch 50 can be considered to be part of the first latch engagement surface or considered as separate first latch engagement surfaces. The surfaces 70, 76, 78, and 80 (and the corresponding surfaces at the opposite side of the latch comprise a form of latching surfaces. The surface 72 has an upwardly sloped first surface portion 76, a base surface portion 78 (further from pin 52 than, or more distally than, the surface 76) and an upwardly facing distally positioned sloped surface 80. The radius of curvature of surface 70 is desirably smaller than the radius of curvature of surface 72 in this embodiment. In effect, the surface comprising surface portions 76, 78 and 80 can be sinusoidal in shape. In the same manner, as can be seen in FIG. 2, the first latch 50 can comprise an upwardly facing first concave engagement surface 90 and a second upwardly facing concave engagement surface 92. A ridge or peak 94 is positioned between the surfaces 90 and 92. The surface 92 has an upwardly sloped first surface portion 96, a base surface portion 98 (further from pin 52 than the surface 96) and an upwardly facing sloped surface 100. The radius of curvature of surface 92 is desirably greater than the radius of curvature of surface 90 in this embodiment. In effect, in this embodiment the surface comprising surface portions 96, 98 and 100 can be sinusoidal in shape.

A land 110 is desirably positioned between the sloping surfaces 72 and 92 of the respective legs 62, 60. The land extends upwardly above the surfaces 76, 96 and 78, 98. The land comprises a first upwardly facing land concave surface 112 and a second upwardly facing land concave surface 114. As can be seen in FIG. 2, the land 110 starts at a location below the respective peaks 74, 94 and extends downwardly to a ridge 120 between the concave land surfaces 112, 114. The radius of curvature of surface 112 is smaller than the radius of curvature of surface 114 in this example. In addition, the radius of curvature of surface 114 is greater than the radius of curvature of the surfaces 78 and 98. Surface 114 comprises an upwardly sloping surface 116, a base surface 118 and a forward surface 120. In this example, the forward surface 120 is of the same slope as surfaces 80, 100 to provide a smooth surface across the distal end of the upper portion of the lower latch 50. The illustrated land 110 also comprises a rear upwardly sloping surface 113 that desirably abuts the front surface 117 (shown in FIG. 6) of the column 40 when the latch 10 is in an open position as explained below in connection with FIG. 12.

As shown in FIG. 1, the distal end 130 of the lower latch 50 can comprise a recess 132 for use in gripping by a user to pull and pivot the lower latch 50 in a direction counter to the directions 54, 55 in which the lower latch 50 is biased. This will be explained more fully below.

The illustrated coupler also comprises an upper or second latch 150. The upper latch 150 is coupled by a pin 152 to the column 40 such that latch 150 is rotatable or pivotal relative to the column. The pivot axis defined by upper latch pin 152 is desirably perpendicular to the longitudinal axis of the shank 26 (FIG. 6) and parallel to the pivot axis defined by lower latch pin 52. The pivot axis defined by pin 152 is positioned above and forwardly of the pivot axis defined by the pin 52. The upper latch 150 is desirably biased about pin 152 in the opposite direction of biasing the lower latch 50 about pin 52. The biasing of upper latch 150 can be accomplished, for example, by one or more springs, such as by torsion springs as explained below. When viewed from the left as in FIG. 1, the upper latch 150 is biased in a clockwise direction as indicated by arrow 154. When viewed from the right as in FIG. 2, the upper latch 150 is biased in a counter clockwise direction as indicated by arrow 156.

Figure 7:
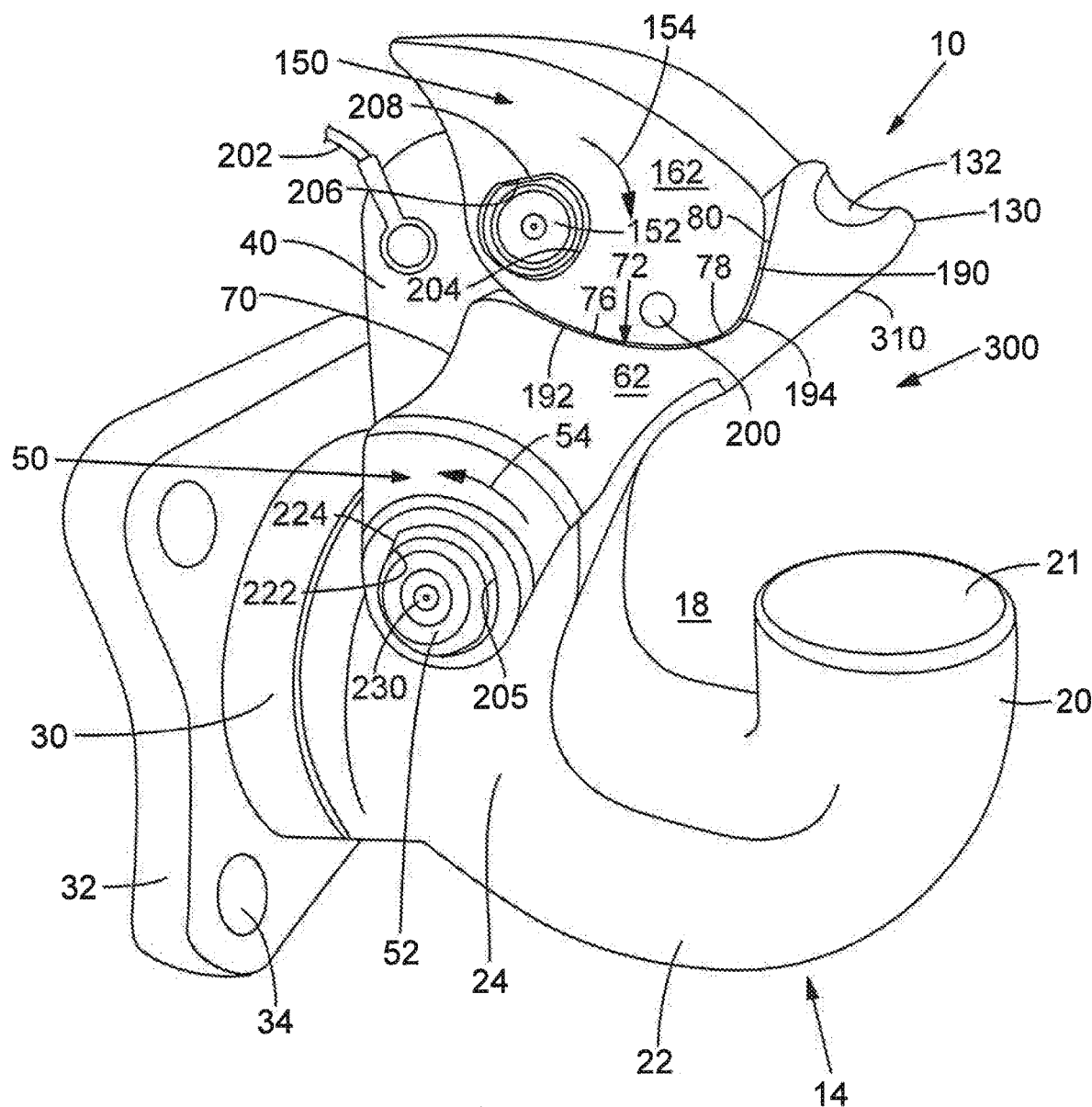
FIG. 7 is a left-side perspective view of the towing coupler of FIG. 1 shown in an open state ready, for example, to receive a draw bar eye attached to a vehicle for coupling to the coupler.

In FIG. 1, the lower or first latch 50 is shown in a closed position with the distal end of the lower latch engaging the leg 20 of the hook and closing off access to the draw bar receiving space. Less desirably, in the closed position, the distal end of the latch can be spaced from the leg 20 by a gap that is small enough to prevent removal of a draw bar from the draw bar receiving space when the lower latch is closed. In addition, in FIG. 1, the second or upper latch 150 is shown in a second position. In FIG. 7, the second latch is shown in a first position and the lower latch is shown in an open position.

As can be seen in FIG. 2, the upper latch 150 can comprise first and second spaced apart legs 160, 162 projecting rearwardly from a front portion 164 of the body 168 that comprises the upper latch 150. A channel 166 can be provided between the legs 160, 162 and an upper front portion of the column 40 can be positioned between the legs 160, 162 and between latching surfaces at the outer surfaces of the legs that face respective latching surfaces of the lower latch. The latching surfaces of the upper and lower latches are configured to at least partially engage one another to retain the lower latch in the position to which it is moved. The latch 150 comprises an upwardly extending latch engagement portion 170 that projects above the axis of pin 152 and that has a forward portion extending forwardly of a vertical plane through the axis of pin 152 when the upper latch is in the closed position shown in FIG. 2. The upper latch leg 160 comprises a first convex lower latch engaging surface 180 (lower when in the position shown in FIG. 2). The first lower latch engaging surface 180 is spaced from the latch actuating portion 170. The first latch engaging surface 180 is positioned at opposite sides of a horizontal plane extending through the axis of the pin 152 when the upper latch is in the position shown in FIG. 2. The leg 160 also comprises a second concave lower latch engagement surface 182. The second lower latch engagement surface 182 is positioned rearwardly of a vertical plane through the axis of pin 152 when the upper latch is in the position shown in FIG. 2. In addition, an arcuate transition surface 184 extends between the surfaces 180 and 182. The leg 162 shown in FIG. 1 has a similar first convex lower latch engagement surface 190 and a second rearwardly positioned concave lower latch engagement surface 192 with an arcuate transition surface 194 positioned between the surfaces 190 and 192.

When the latch is in the closed position as shown in FIGS. 1 and 2, the first lower latch engaging surface 190 abuts the lower latch surface 70 and the first lower latch engaging surface 180 abuts the lower latch surface 90. In addition, springs bias the upper latch 150 in the directions of arrows 154, 156 and urges these surfaces 190, 70 and 180, 90 together. In addition, the peaks 74, 94 of the respective shoulder 62, 60 retain the upper latch in this engaged position. For added safety, a safety pin 200 is inserted through the legs 162, the column 40 and the leg 160 to further retain the upper latch 150 against the lower latch 50 when the latch is in the closed position. The pin 200 can be coupled to the column 40 by a cable 202.

With reference to FIGS. 1 and 2, the surfaces 72, 92 comprise a form of first latch engagement surface. In addition, the surfaces 70, 90 comprise a form of second latch engagement surface. Also, the surfaces 180, 190 comprise a form of a third latch engagement surface and the surfaces 182, 192 comprise a form of a fourth latch engagement surface.

Referring to FIG. 6, the upper latch has a base portion 191 with the first lower latch engaging surfaces 180,190 at the lower end of the base portion 191 in FIG. 6. The first lower latch engaging surfaces desirably span from side to side of the upper latch 150. The base portion 191 can also comprise an upper concave surface 193 opposed to the surfaces 180, 190. In addition, the column 40 can comprise a forwardly projecting nose portion 195 positioned above the surface 193. The nose portion can have a convex outer surface 197 configured to match the concavity of the surface 193 such that as the upper latch pivots about the axis of pin 152, the surfaces 193, 197 remain proximate to one another. In the closed position shown in FIG. 6, the service load applied by a draw bar eye is generally in the direction of arrow 199. If the pin 152 were to fail, the upper latch is captured between the surfaces 190, 70, 193 and 197 (in FIG. 6 and surfaces 180, 90, 193 and 197) at the opposite site of the latch to retain the upper and lower latches 150, 50 in the closed position. That is, if the upper latch pin 152 were to fail from the applied force 199, the concave geometry of the upper latch 150 (surface 193) will contact the convex geometry of the surface 197 of the nose portion 195 of the coupling body 40 and prevent the latch from opening. The lower latch 50 contacts the upper latch 150 in a manner that compresses the upper latch 150 against the coupling body 40.

Figure 12:
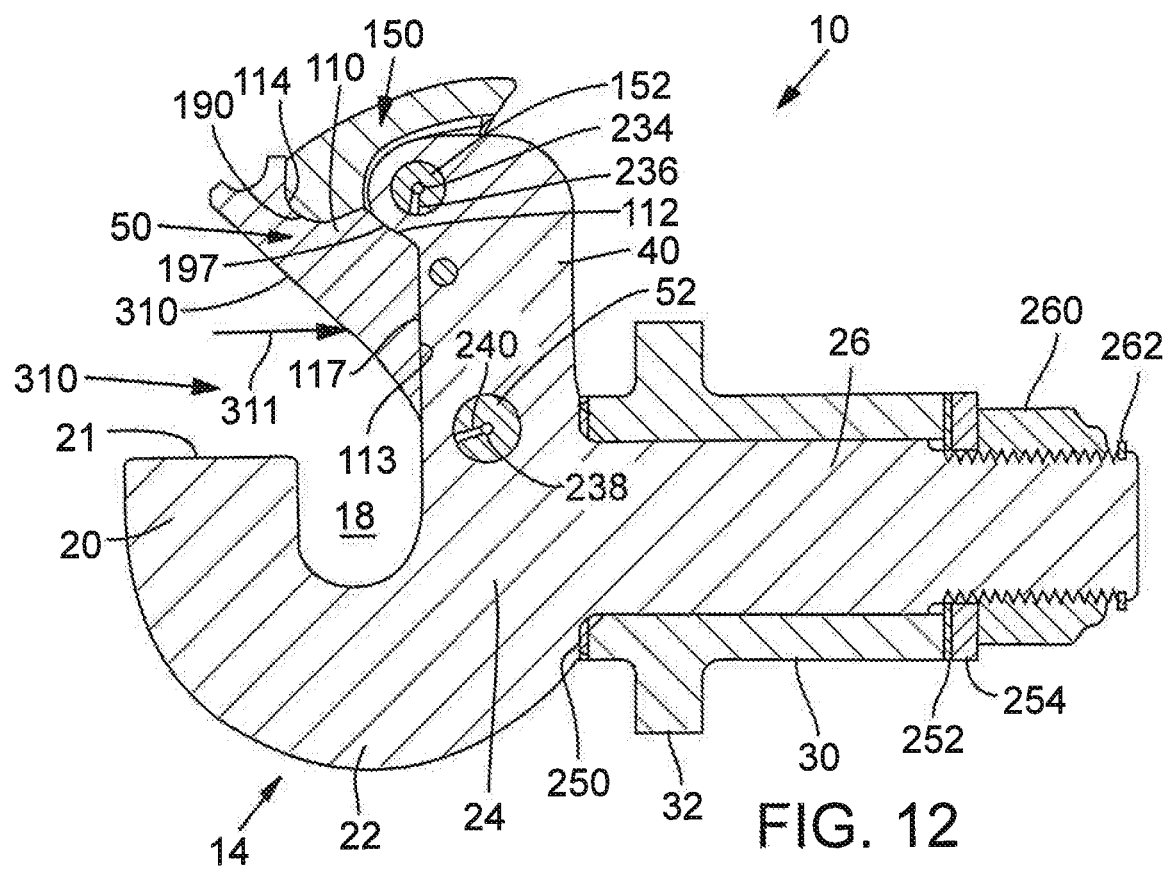
FIG. 12 is a vertical sectional view of the open towing coupler of FIG. 11, taken along line 12-12 of FIG. 11.

Desirably, the pins 52 and 152 rotate with the rotation of the latches for lubrication purposes. Although the pin 52 can be keyed to the lower latch 50 and the pin 152 can be keyed to the upper latch 150, in one exemplary approach interengaging features are provided between pin 52 and the lower latch and between pin 152 and the upper latch 150 that cause the respective pins to pivot with pivoting motion of the latches. For example, the opening 204 through which pin 152 extends can be provided with a flat surface 206 where the opening passes through leg 62 of the lower latch. In addition, the pin 152 can have a flat surface 208 that abuts the surface 206 with the surfaces 206, 208 preventing the relative rotation of the upper latch 150 and the pin 152. In the same manner, the opening 205 through which pin 52 extends can be provided with a flat surface 222 where the opening passes through leg 162 of the upper latch. In addition, the pin 52 can have a flat surface 224 that abuts the surface 222 with the surfaces 222, 224 preventing the relative rotation of the lower latch 50 and the pin 52. The pins 52, 152 can have respective grease ports 230, 210 communicating with respective axially extending passageways extending from the grease ports along a portion of the length of the respective pins. FIG. 6 and FIG. 12 illustrate the axial extending passageway 234, 238 in the pins 152, 52. A radially extending passageway 236 can communicate from axial passageway 234 to the surfaces between pin 152 and the column 40. A radially extending passageway 240 extends between the axial passageway 238 and the surfaces between pin 52 and the column 40. Although optional, with this construction, grease introduced through the respective grease ports 210, 230 is dispersed to the surfaces between the pins and column and is dispersed by the motion of the pins as the upper and lower latches rotate to more effectively lubricate the pins and column.

Figure 3:
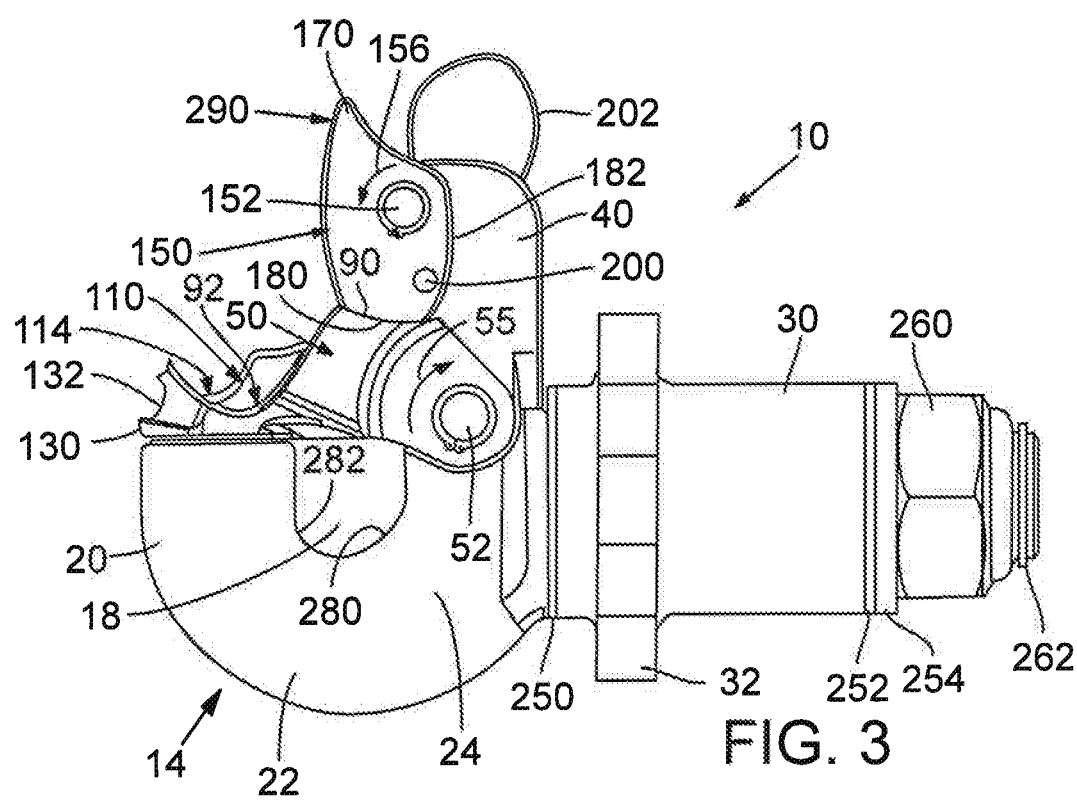
FIG. 3 is a side elevational view of the closed towing coupler of FIG. 1.
Figure 4:
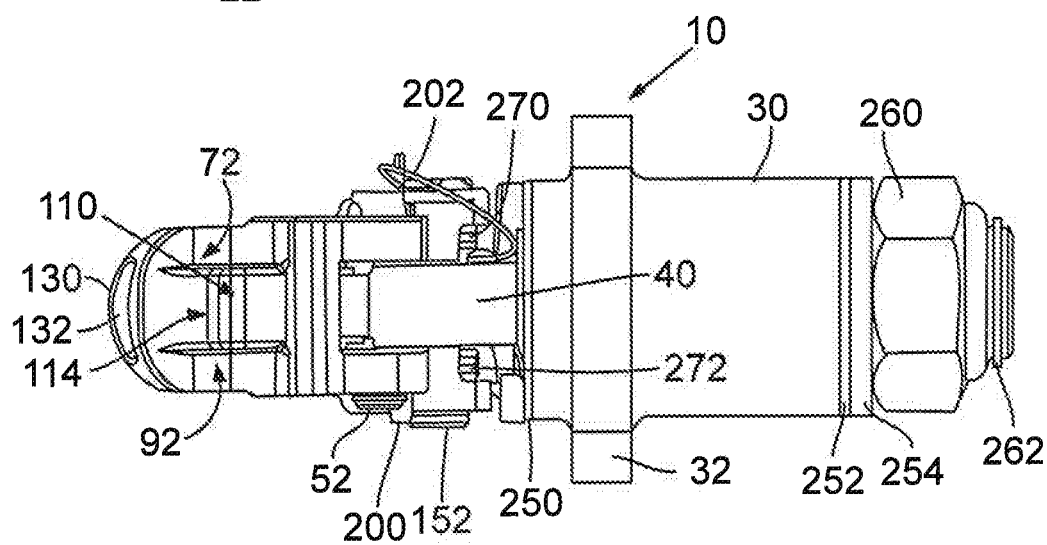
FIG. 4 is a top plan view of the closed towing coupler of FIG. 1.

With reference to FIGS. 3-6, the description of FIGS. 1 and 2 applies to these FIGS. and components in common between this FIGS. will not be re-described. FIGS. 3 and 4 illustrate additional portions of an exemplary housing 30. The housing 30 pivotally receives a shaft portion 26 of the body 14 (FIG. 6). A first bearing, such as a ring 250 is positioned between the front portion of the housing 30 and the column 40. A second bearing, such as a ring 252 is positioned between a rear portion of the housing and a spacer 254. As a desirable example, these rings 250, 252 can comprise polymer washers that in effect seal the ends of the housing and retain lubricant in the surfaces between the shaft 26 and housing 30. In addition, the polymer rings can be of a reduced or low friction material, such as a nylon material, to further facilitate the pivoting movement of the body, and thereby the hook portion 14 and shaft 26, of the coupler relative to the housing 30. A nut 260 threaded onto the distal end of the shaft 26 bears against the spacer 254. A retainer, such as a snap ring 262, prevents the nut from separating from the shaft 26. As a specific example, the nut 260 can be a nylon lock nut which allows the nut to be tightened against a spacer 254 as desired to set the resistance to pivoting movement between the housing 30 and the shaft 26. As can be seen in FIG. 4, springs 270, 272, which can comprise torsion coil springs, can be positioned on opposite sides of the column 40 to bias the upper latch 150 in the direction 156 shown in FIG. 3.

With further reference to FIG. 3, the opening 18 between hook sections 20, 22 and 24 can be asymmetrical when viewed from the side. That is, the radius of curvature of the opening 18 is smaller at a rear portion 280 than at a front portion 282. This construction allows a received draw bar eye to pivot within the opening 18 upwardly, relative to a horizontal plane when the latch coupler is vertical, a lesser extent than the allowed downward pivoting of the received draw bar eye. As explained below, the draw bar eye in one specific example can pivot upwardly through an angle of 35 degrees with respect to horizontal plane and downwardly 40 degrees when the coupler 10 is in a vertical orientation. This aids in the prevention of coupler and draw bar eye binding when articulated in vertical directions, such as can occur in extreme off-road terrain conditions, including large raised and lowered surfaces separated by a short distance relative to the wheelbase or track of the vehicle (e.g., a large mound followed by a deep ditch).

FIGS. 7-12 illustrate the latch 50 in an open position with a gap 300 between the lower latch 50 and the hook portion 14. Elements in these FIGS. that have been discussed above are not discussed in detail below except where helpful in understanding the operation of the coupler 10. To shift the latch between the closed position shown in FIG. 3 to the open position shown in FIG. 7, a user can apply a force in a direction of arrow 290 to the upper portion 170 of the upper latch 150 as shown in FIG. 3. The force 290 acts against the bias of the springs 270, 272 and rotates the upper latch 150 in a direction counter to the directions 154, 156. As surfaces 70, 190 and 90, 180 clear one another, the bias on the lower latch 50 in the direction of arrows 54, 55 pivots the lower latch 50 to the open position as shown in FIG. 7.

Figure 8:
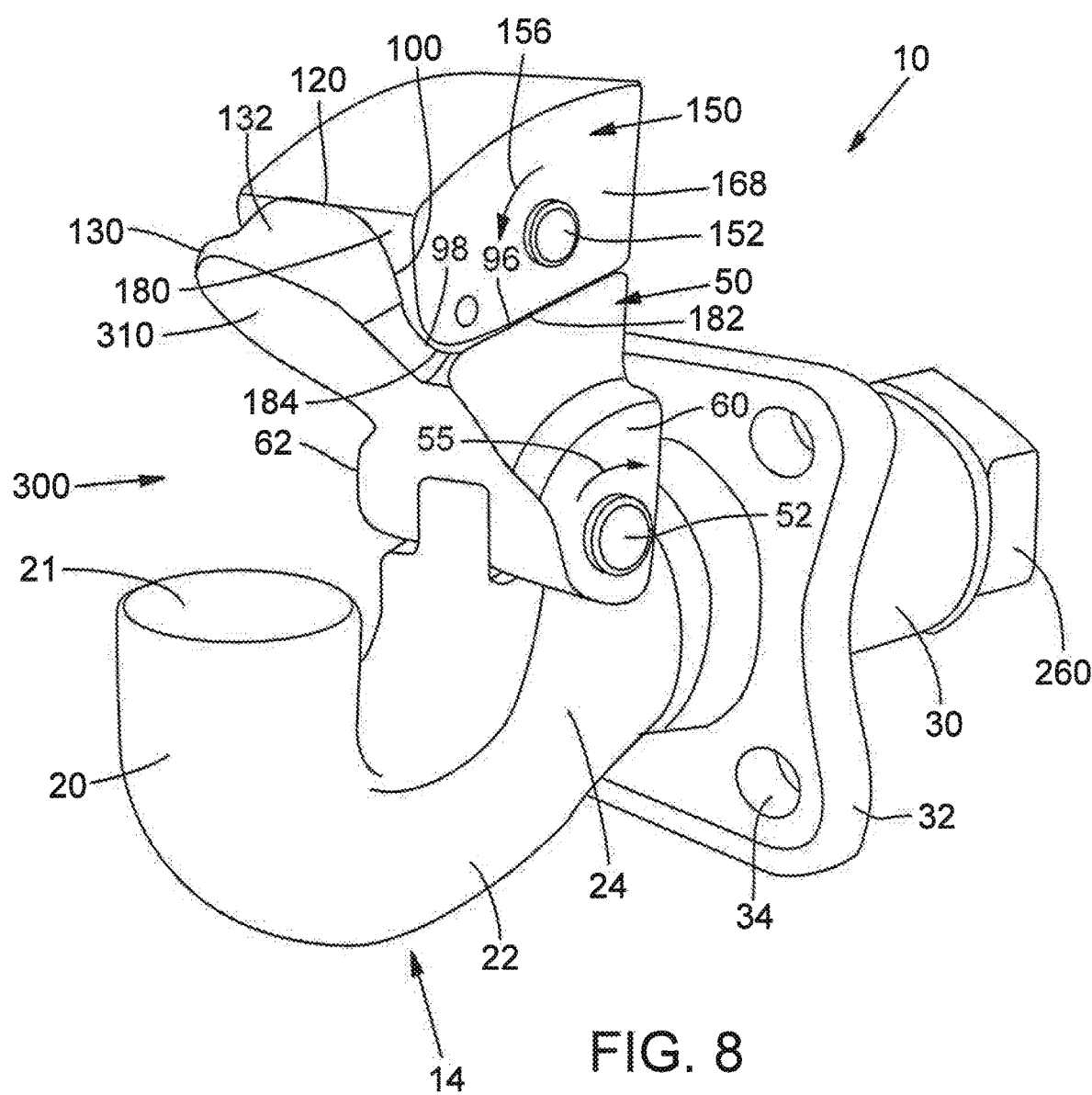
FIG. 8 is a right-side perspective view of the open towing coupler of FIG. 7.
Figure 9:
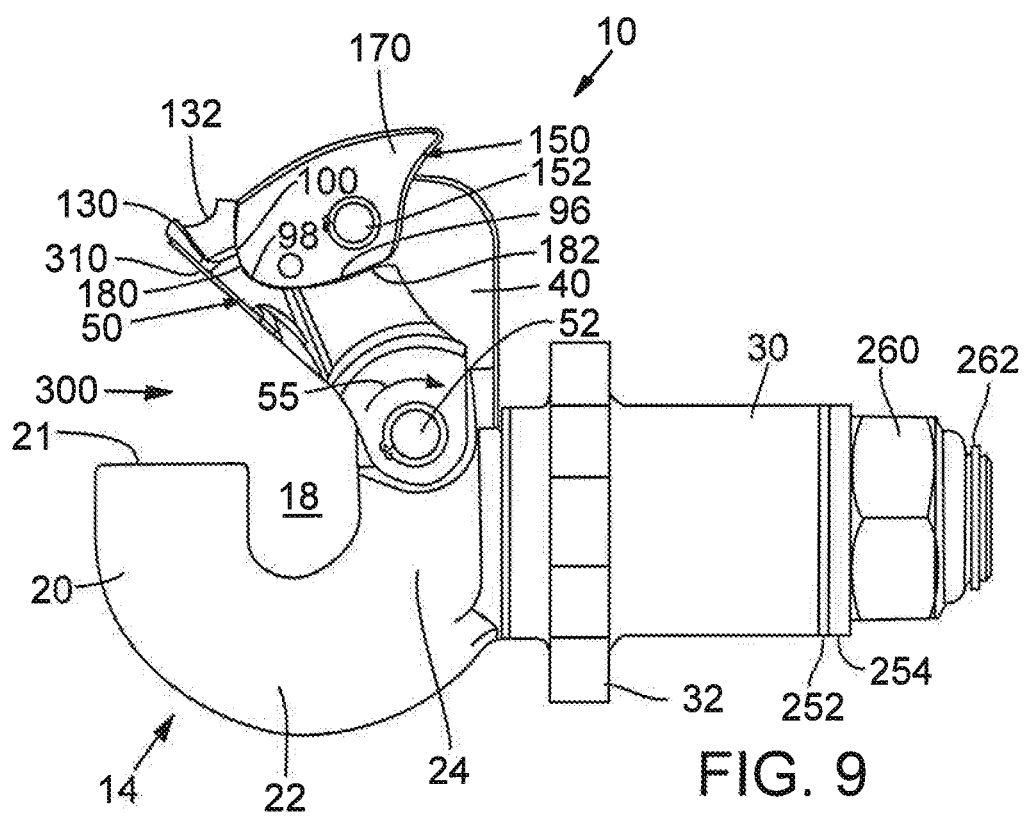
FIG. 9 is a side elevational view of the open towing coupler of FIG. 7.
Figure 10:
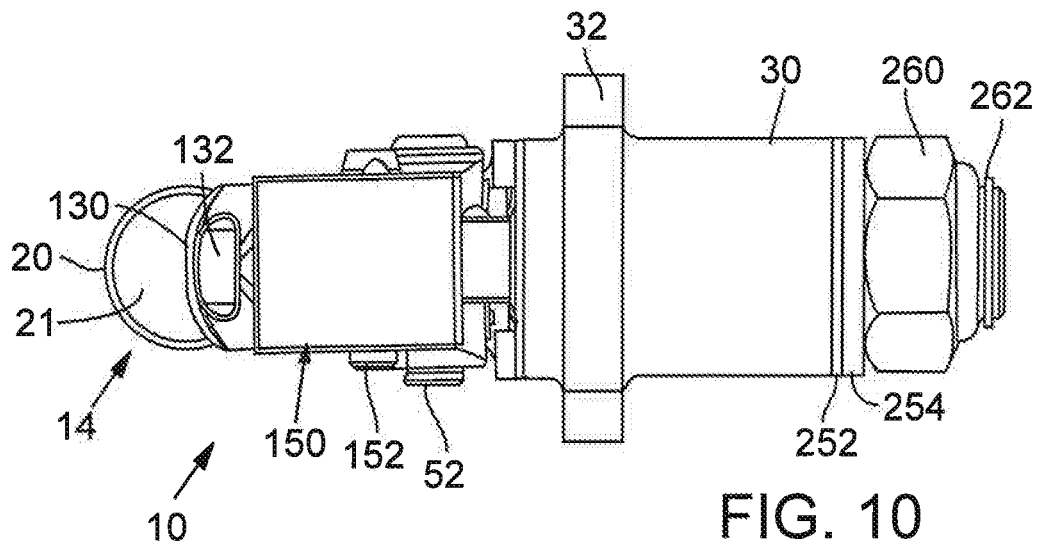
FIG. 10 is a top view of the open towing coupler of FIG. 9.
Figure 11:
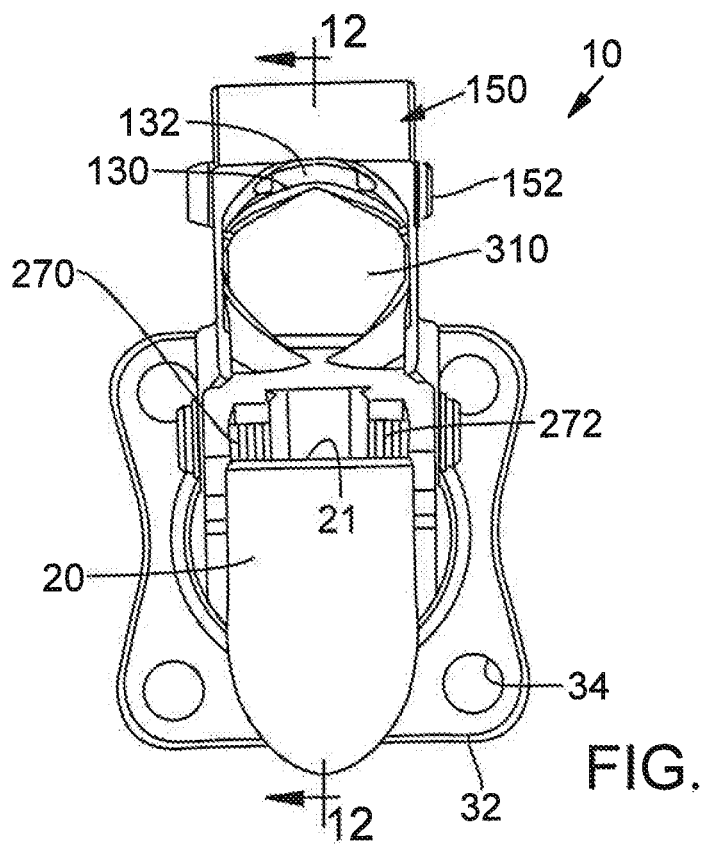
FIG. 11 is a front elevational view of the open towing coupler of FIG. 9.

When in the position shown in FIGS. 7 and 8, the surfaces 190, 192 and 194 of the upper latch 150 are desirably positioned respectively to engage the surfaces 80, 76 and 78 of the lower latch 50 and the surfaces 182, 184 and 180 of the upper latch are positioned to respectively engage the surfaces 96, 98 and 100 of the lower latch. These respective facing upper and lower latch surfaces desirably at least partially engage one another and more desirably a majority of these facing surfaces are coupled together, such as abutting one another, and most desirably substantially all (more than ninety percent) of these facing surfaces are coupled together such as abutting and thereby engaging one another as shown in part in FIG. 12. Also, although not shown in these figures, except partially in FIG. 12, the land 110 of lower latch 50 is positioned at least partially between the legs 162, 160 of the upper latch 150. In addition, the surface 112 of the land 110 desirably engages the surface 197 of the column and the surface 113 of the land desirably engages the surface 117 at the front of the column 40. In addition, the surface 114 of the land desirably engages the surface 190 of the upper latch 150. These respective pairs of facing surfaces, 112, 197; 113, 117; and 114, 190; desirably at least partially engage one another and more desirably a majority of these facing surfaces are coupled together, such as abutting one another, and most desirably substantially all of these facing surfaces are coupled together such as abutting and thereby engaging one another as shown in part in FIG. 12.

It is not unusual for the coupler of a truck or trailer being backed up toward the coupler 10 to apply a substantial force in the direction of arrow 311 in FIG. 12. By having the respective above described engaging surfaces effectively backing the lower latch 50 up by the column and upper latch, forces applied in the direction of arrow 311 are distributed over the entire coupler assembly rather than having one component (e.g. the lower latch or a portion thereof) bearing substantially the entire load. These loading forces result in compressive loading of the majority of the coupler components when the latch is in the open position. Positioning of the land between the legs 160, 162 of the upper latch 150 in the open position also assists in maintaining the vertical alignment of the upper and lower latches 50, 150.

To move the latch from the open position shown in FIG. 7 to the closed position shown in FIG. 1, a user can pull on the lower latch, such as by engaging the recess 132 to urge the lower latch in a clockwise direction in FIG. 7, counter to the bias applied by one or more springs to the lower latch 50 in the direction of arrows 54, 55 in FIGS. 7 and 8.

As can be seen in FIGS. 7 and 8, the undersurface of the lower latch 50 indicated at 310, is angled downwardly from front to rear, when the coupler is in a vertical orientation, and with surfaces 113, 117 in engagement with one another as shown in FIG. 12. As a result, the surface 310 assists in guiding a draw bar eye downwardly into the hook portion 14. That is, assuming for example that a truck is backing up, upon engaging the surface 310, the draw bar eye will tend to slide downwardly along the surface 310 into the opening 18 of the hook portion 14.

Figure 13:
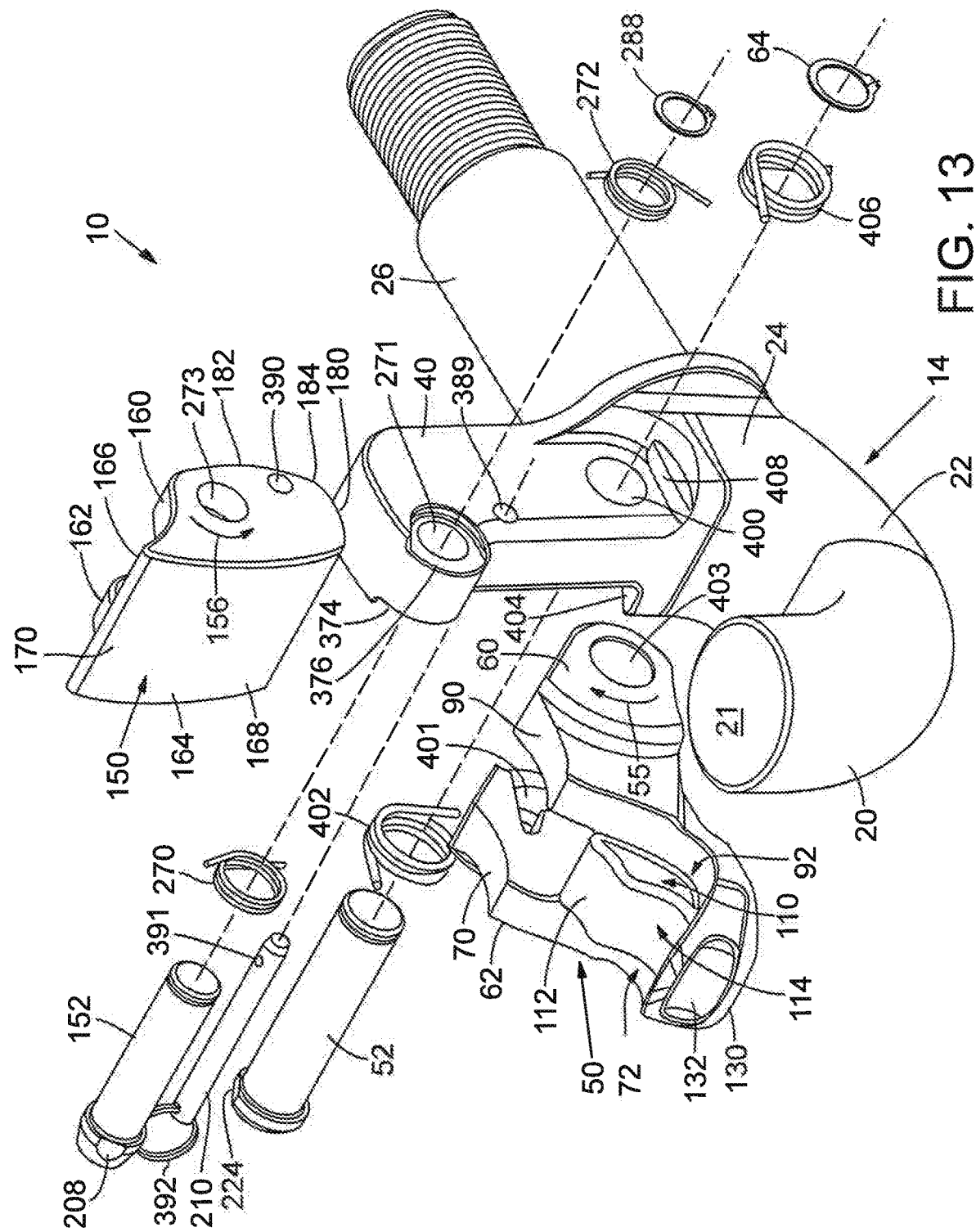
FIG. 13 is an exploded view of a towing coupler of FIG. 1 without the housing shown in FIG. 1.
Figure 19:
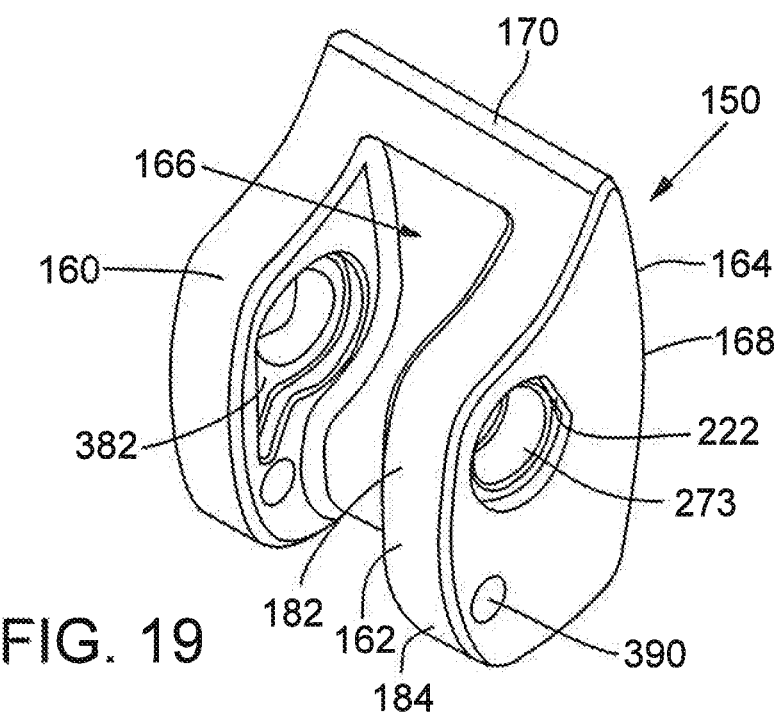
FIG. 19 is a rear perspective view of one form of an upper latch for the towing coupler embodiment of FIG. 1.

Referring to the exploded view of FIG. 13, which omits the housing 30 for convenience, the upper latch pin 152 is inserted through the opening 204 comprising an opening in leg 162 (not shown in FIG. 13), an opening 271 in the column 40 and through an opening 273 in the leg 160 of the upper latch 150. The upper latch 150 is desirably biased as explained above relative to the column 40 by, for example, a spring engaging the upper latch and the column. For example, a spring 270, such as a coiled or torsion spring, can be positioned within a seat 374 at the left side of the column 40 and can surround the opening 271. A similar spring 272, which can be a coiled or torsion spring, can be positioned within a seat 376 at the right side of the column 40 and can surround the opening 271. One end of spring 270 can engage the seat 374 and the opposite end of the spring 270 can engage a seat in upper latch 150 that is like the seat 382 shown in FIG. 19A. In addition, one end of the spring 272 can engage the seat 376 and the opposite end of the spring 272 can engage the seat 382 of the upper latch 150. The respective springs 270, 272 apply a biasing force in the direction of arrows 154 (FIG. 1) and 156 (FIGS. 2 and 13). A snap ring 288, or other fastener, can be used to retain the pin 152 in place when the coupler 10 is assembled.

The safety pin 210 is inserted through an opening through leg 162 (not shown in FIG. 13), through an opening 389 through column 40 and through an opening 390 in leg 160 of the upper latch 150 when the latch is in a closed position. The pin 210 can have a spring biased détente 391 that retains the safety pin in place until such time as a ring 392 at the opposite end of the safety pin from the détente is pulled to cause the détente 391 to retract and allow the removal of the safety pin.

Figure 18A:
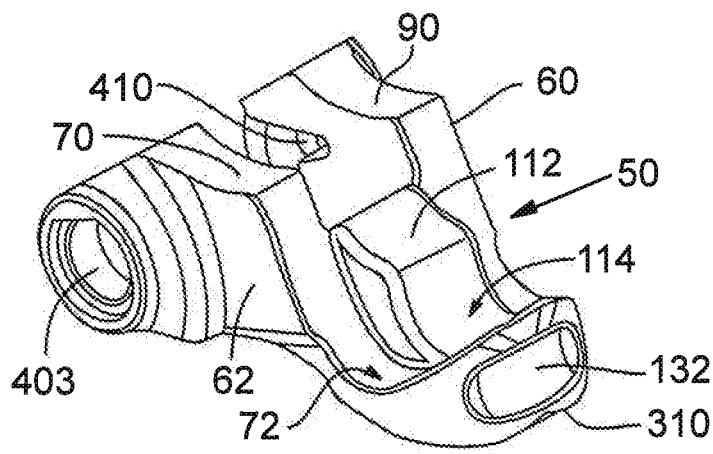
FIGS. 18A and 18B show respective perspective views of one form of lower latch for the towing coupler embodiment of FIG. 1.
Figure 18B:
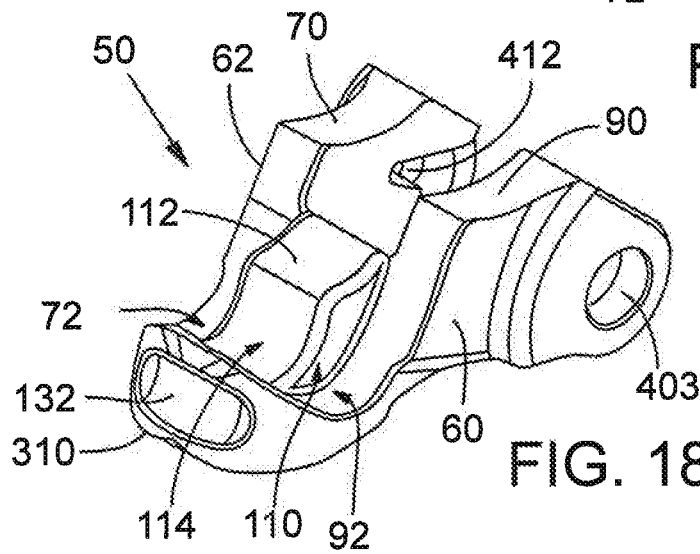

The lower latch pin 52 is inserted through an opening 205 comprising an opening 401 in shoulder 62 of the lower latch 50, an opening 400 in the column 40 and an opening 403 through the leg 60 of the lower latch. The lower latch 50 is desirably biased as explained above relative to the column 40 by, for example, a spring engaging the lower latch and the column. For example, a spring 402, such as a coiled or torsion spring, can be positioned in a seat 404 of the column 40 with one end of the spring engaging the seat. A spring 406, such as a coiled or torsion spring, can be positioned within a seat 408 of the column at the opposite side of the column from the seat 404. One end of the spring 406 can engage the seat 408. The springs 402, 406 are thus positioned between the column and the interior surface of the adjacent legs 62, 60. The shoulders 60, 62 are each provided with a respective seat for engaging the opposite end of each spring from the end engaged by the respective column seat. FIG. 18A shows an exemplary spring engagement seat 410 in the shoulder 60 and FIG. 18B shows a spring engagement seat 412. The springs 402, 406 bias the lower latch in the direction indicated by arrows 54 and 55 in FIGS. 7 and 8.

Figure 14:
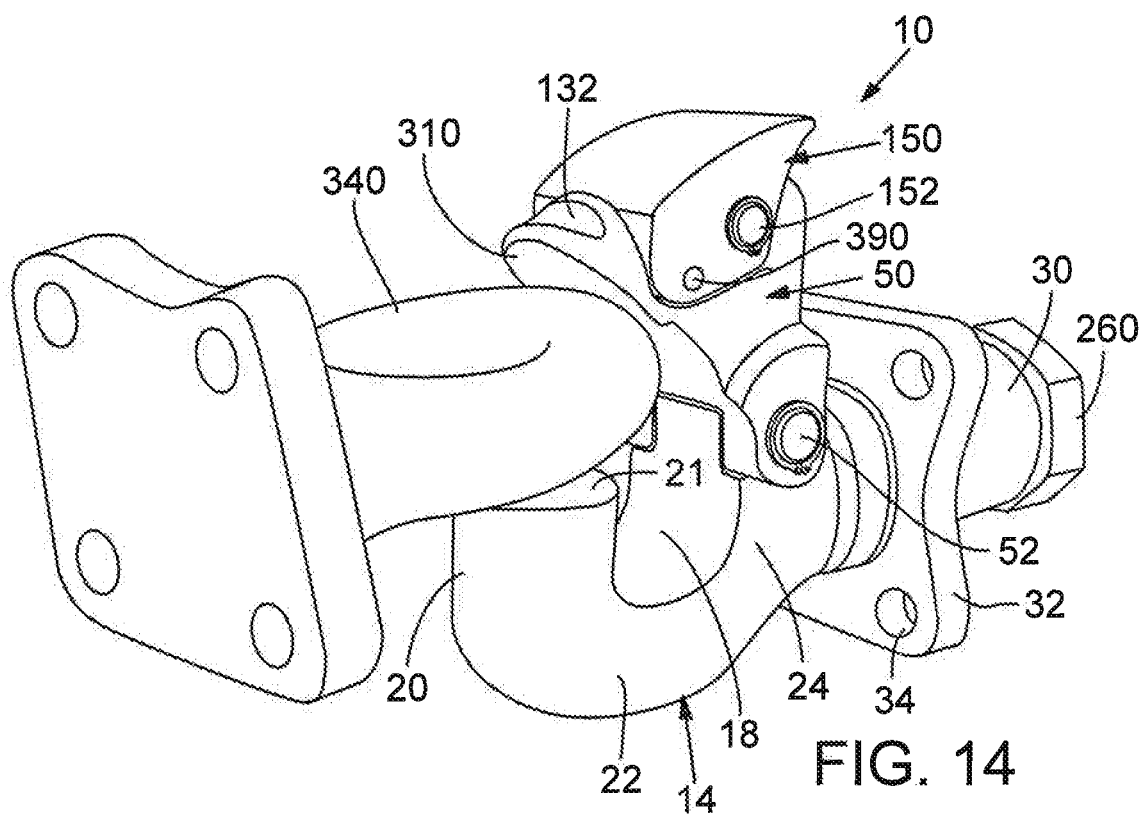
FIG. 14 is a perspective view showing the towing coupler of FIG. 1 in an open position and receiving a draw bar eye and also showing the guiding of the draw bar eye onto a hook portion of the towing coupler by a lower surface of a lower latch of the towing coupler.

FIG. 14 illustrates a draw bar eye 340 being positioned on the hook 14 of the coupler 10. As the draw bar eye 340 is moved toward the coupler, the surface 310 of the lower latch 50 is engaged by the draw bar eye and directs the draw bar eye downwardly into the opening 18 of the hook portion 14.

Figure 15:
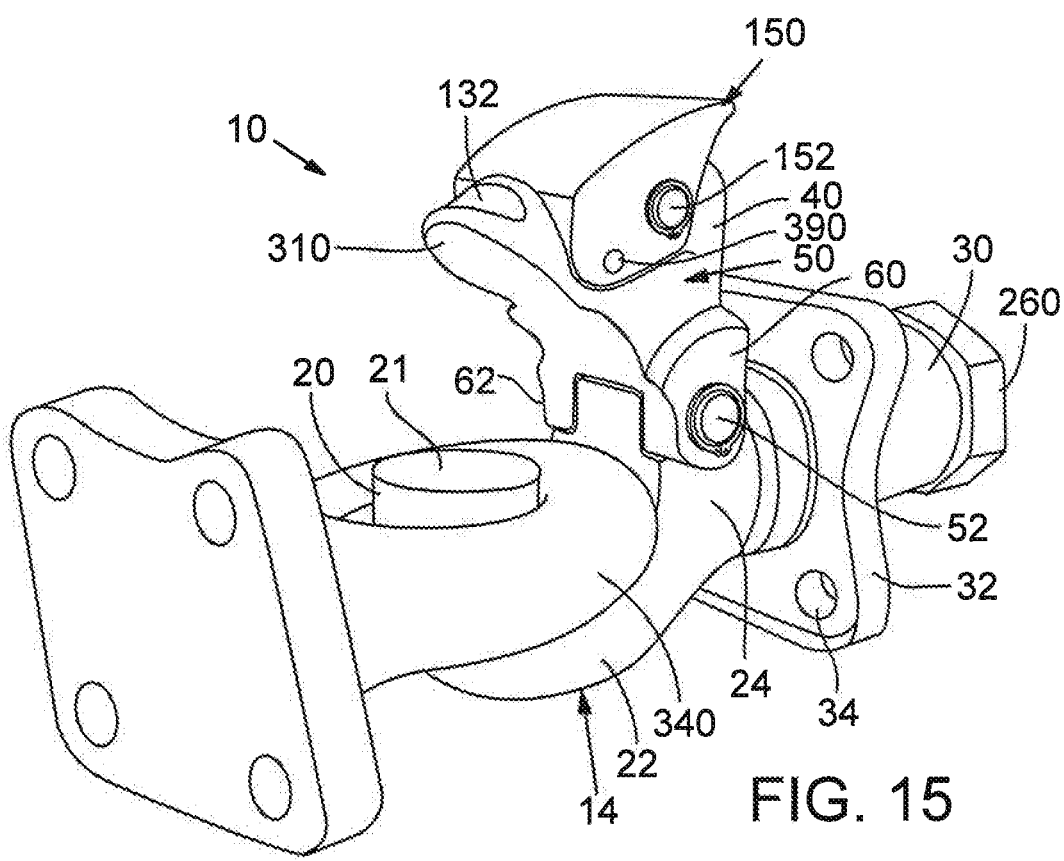
FIG. 15 shows the draw bar eye in a position received by the open towing coupler.

FIG. 15 illustrates the draw bar eye 340 on the hook portion 14 with surface 21 of the leg section 20 of the hook portion 14 shown positioned above the illustrated draw bar eye.

Figure 16:
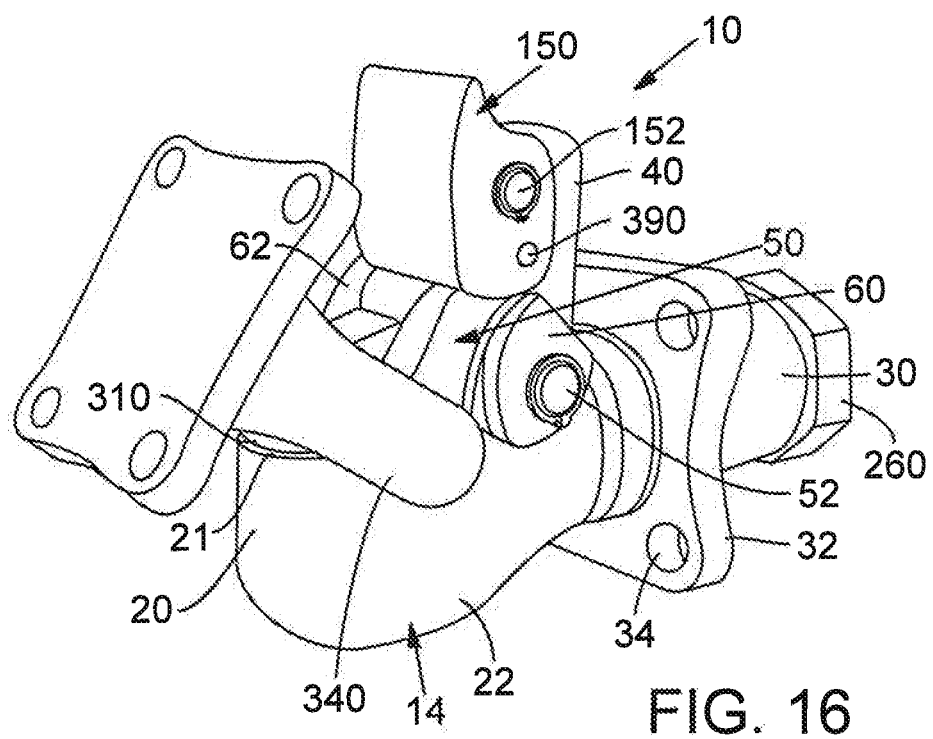
FIG. 16 shows the draw bar eye in an upper position as allowed by the towing coupler.
Figure 17:
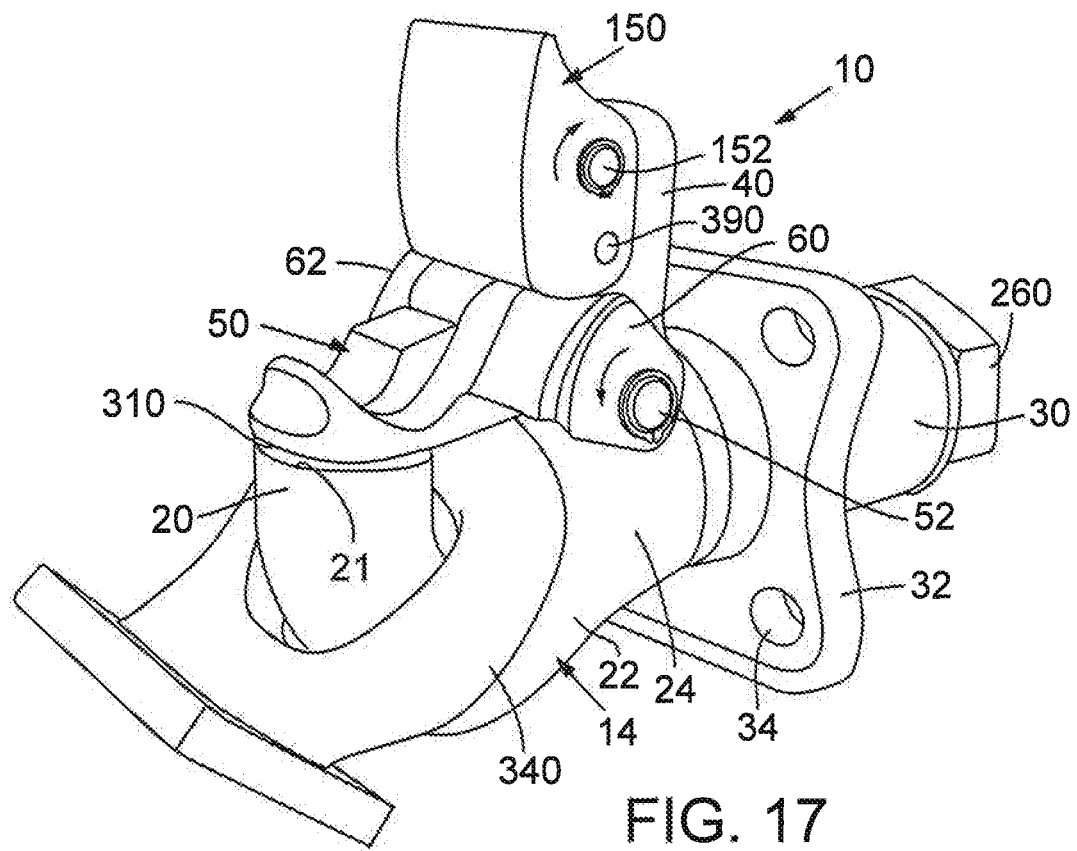
FIG. 17 shows the draw bar eye in a lower position as allowed by the towing coupler.

FIG. 16 illustrates the coupler 10 in a closed position and with the draw bar eye 340 pivoted upwardly as permitted by the illustrated construction. As previously pointed out, the construction allows pivoting of the draw bar eye upwardly through an angle of, for example, 35 degrees from a horizontal plane when the coupler 10 is vertical. FIG. 17 illustrates the draw bar eye 340 pivoted in a downward direction when the latch 10 is in a closed position. The illustrated coupler allows downward pivoting of the draw bar eye, for example 40 degrees from a horizontal plane when the coupler 10 is in the vertical orientation. These upward and downward pivot angles can be varied but do facilitate relative movement between the truck and towed trailer, for example, as the truck hits a bump or crests a hill.

The coupler of FIGS. 1-19 as described above can be modified to include a first or auxiliary actuator, such as an auxiliary cylinder for closing the latch and may also, but is not required to, include a draw bar eye clamping lever as described below.

A coupler embodiment with a latch closer is described below with reference to FIGS. 20-34. In these FIGS., elements in common with those of FIGS. 1-20 have been assigned the same numbers. The description below focuses on the different features of the embodiments of FIGS. 20-34, as elements in common with those of FIGS. 1-20, or that differ in minor ways from the above described corresponding components, are readily understood from the above description. The embodiments of the latch closer mechanisms as described below can be used with or with out a clamp closing mechanism. In addition, the coupler closer can be used with a coupler that does not have first and second latch elements as described above as it can, for example, be used to close a single component latch.

With reference to the example of FIGS. 20-26, exemplary coupler 420 is shown with a coupler body 12 comprising a draw bar receiving hook portion such as hook 12 having a draw bar receiving opening 18. The distal surface of the hook in this example is tapered moving away from the apex of the tip of the distal end. Alternatively, the distal surface can be planar or substantially flat, or take other shapes. The coupler desirably comprises a housing 30.

Figure 24:
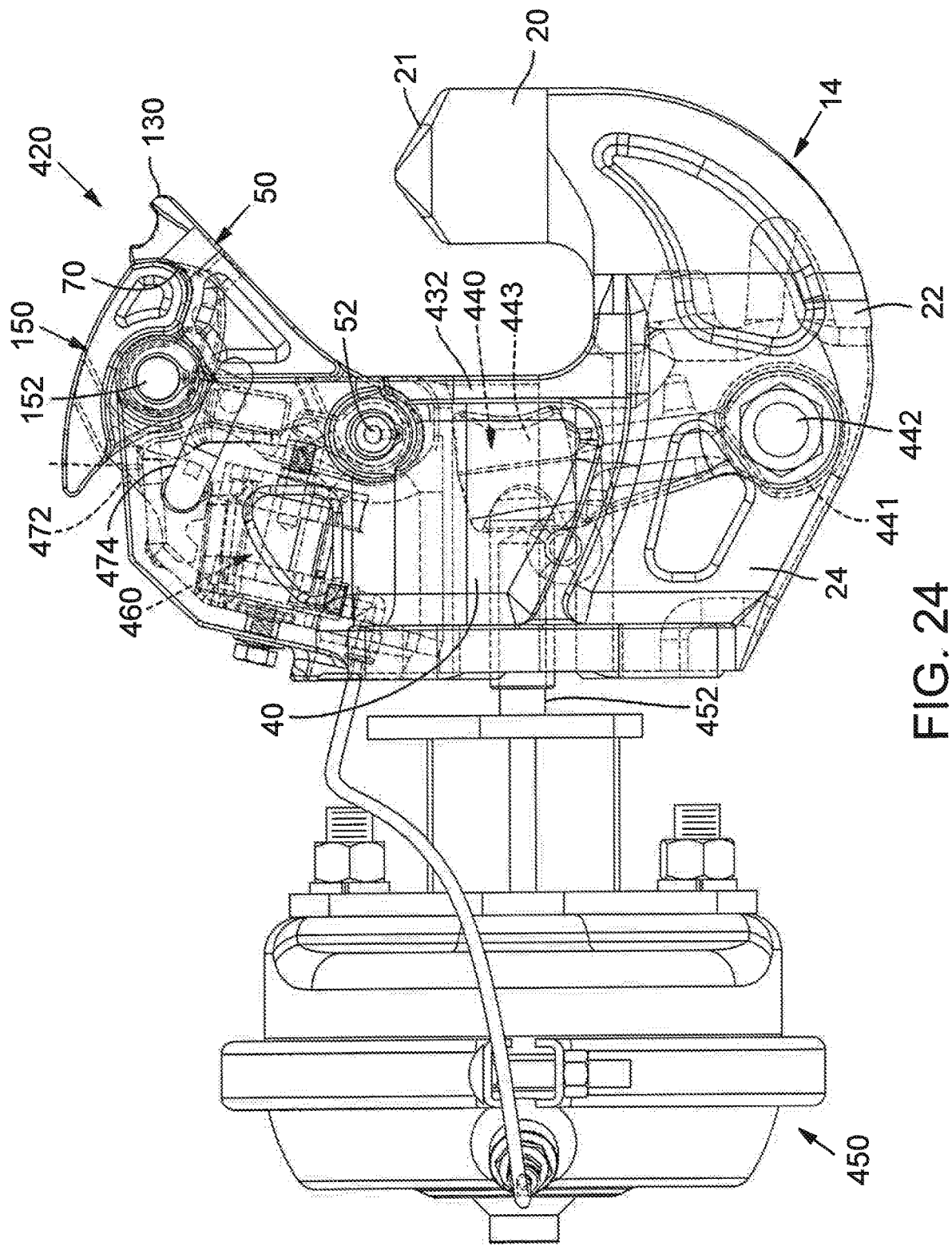
FIG. 24 is a left-side elevational view of the open towing coupler of FIG. 20 with some of the internal components shown in dashed lines for illustration purposes.
Figure 25:
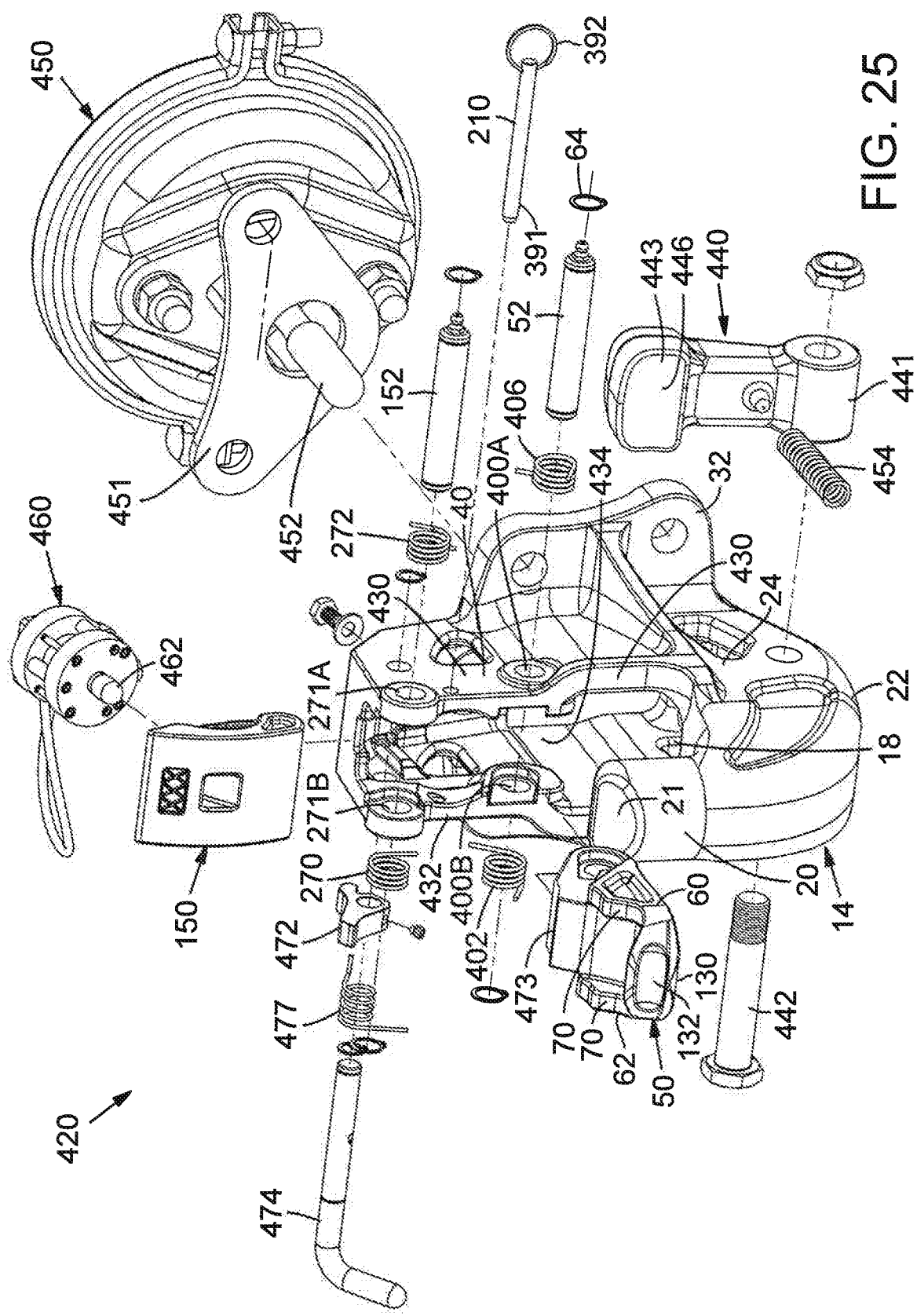
FIG. 25 is an exploded view of the towing coupler of FIG. 20.
Figure 26:
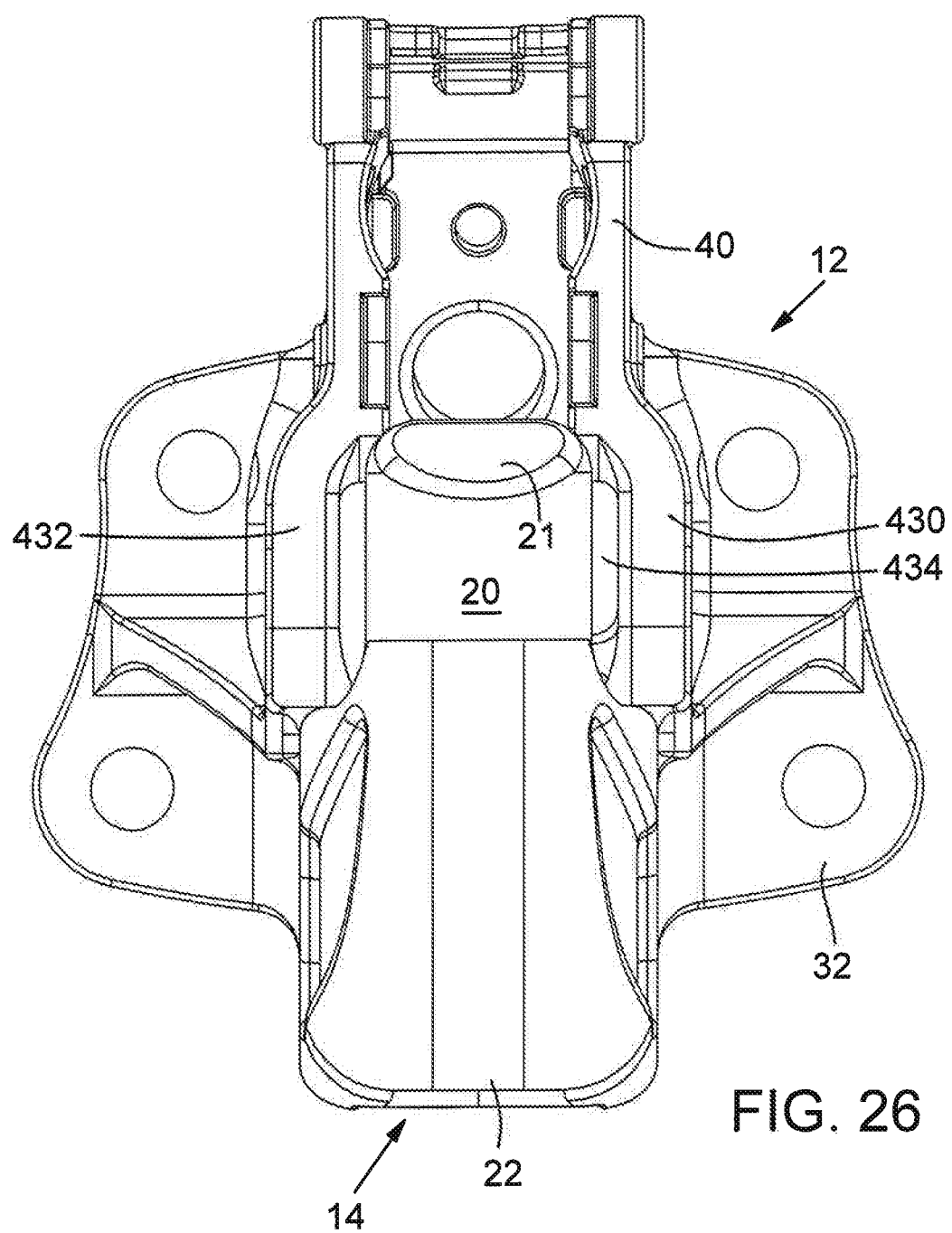
FIG. 26 is a front view of the coupler body of the towing coupler of FIG. 20.
Figure 27A:
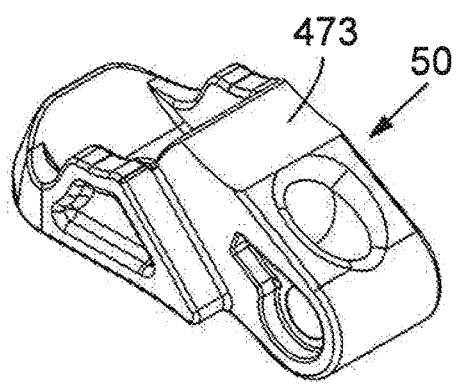
FIGS. 27A-G are views of one form of an exemplary lower latch that can be used in the coupler of FIG. 20.
Figure 27B:
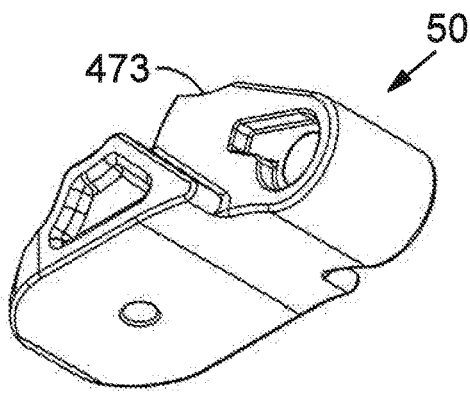
Figure 27C:
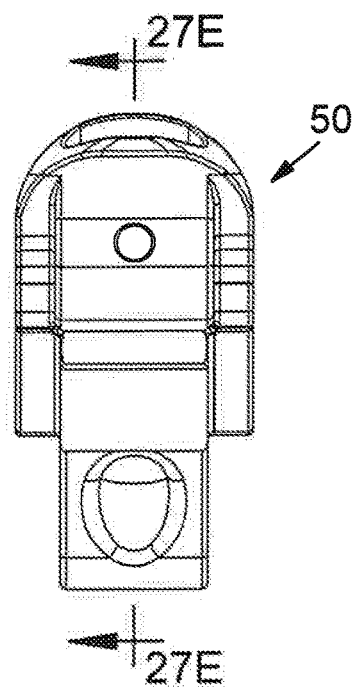
Figure 27E:
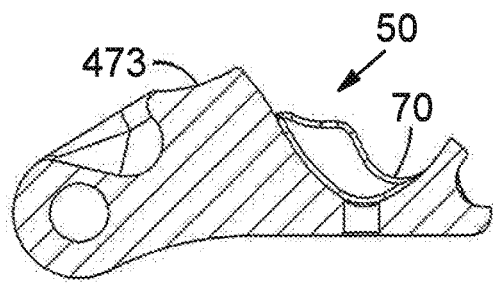
Figure 27F:
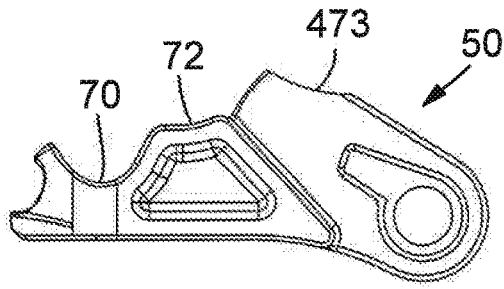
Figure 27D:
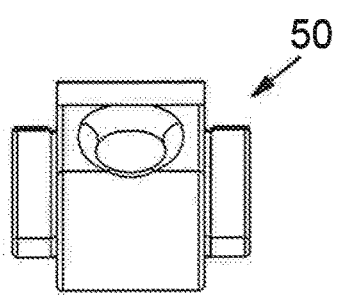
Figure 27G:
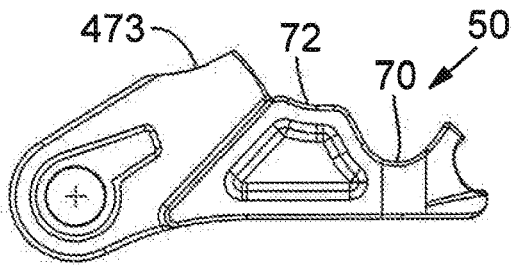
Figure 28A:
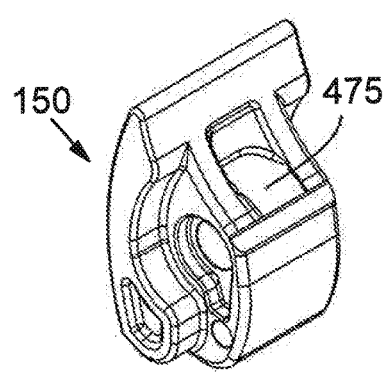
FIGS. 28A-I are views of one form of an exemplary upper latch that can be used in the coupler of FIG. 20.
Figure 28B:
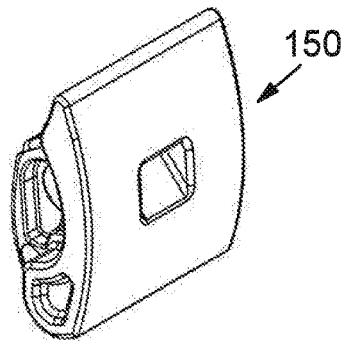
Figure 28C:
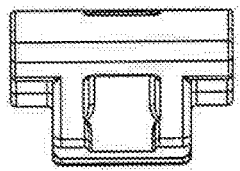
Figure 28E:
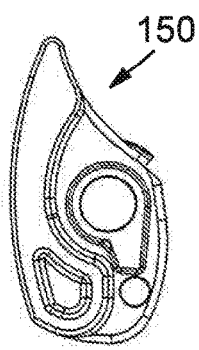
Figure 28D:
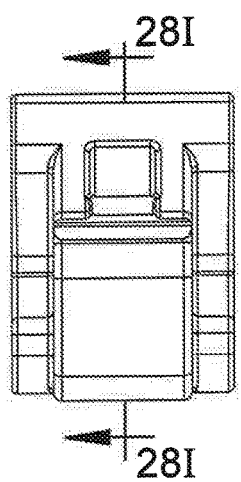
Figure 28G:
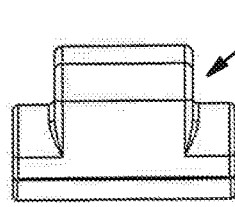
Figure 28F:
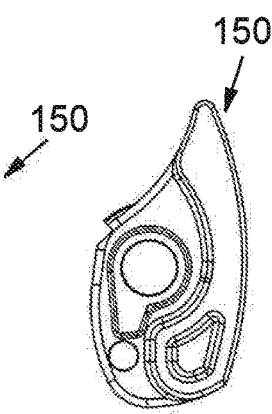
Figure 28H:
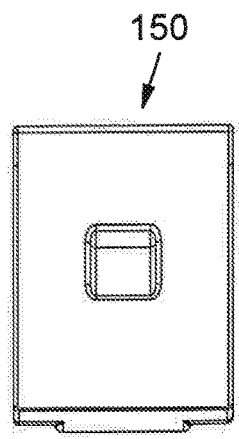
Figure 28I:
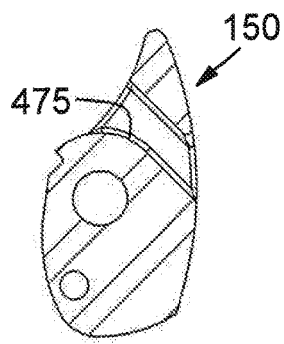

A lower latch 50 (see, for example FIG. 20, and the example of FIGS. 27A-G) is pivoted, such as pivoted by a pin 52, to the coupler body and desirably to the latch supporting portion 40 of the body. The lower latch is desirably biased, such as by a spring, to an open position (away from the hook) as described above. Two such biasing springs 402, and 406 on opposite sides of the support portion 40, are shown in FIG. 25 as one approach to accomplish the biasing. In the embodiment shown in FIGS. 20-25, the lower latch 50 does not have the optional land 110 of the embodiment of FIGS. 1-19. In addition, the support portion 40 in the embodiment of FIGS. 20-25 desirably comprises separate spaced apart side portions 430, 432 that define a cavity or chamber 434 therebetween (FIG. 25, see also FIG. 26). The proximal end of the lower latch is positioned in the cavity and between these side portions 430, 432. The pivot pin 52 extends through both of the side portions (through opening 400A through side portion 430 and opening 400B through side portion 432 (See FIG. 25) and the lower latch when positioned between the side portions. The pin 52 thus pivots the lower latch to the support portion 40.

In addition, an upper latch 150 (see the example of FIGS. 28-28H) is pivoted, such as by a pin 152, to the housing. The upper latch is desirably biased, such as by a spring, to a closed position (toward the hook). With reference to FIG. 25, two such upper latch biasing springs 270, 272 are shown. The pivot pin 152 extends through both of the side portions (through opening 271A through side portion 430 and opening 271B through side portion 432 (See FIG. 25) and the upper latch 150 When positioned between the side portions. The pin 152 thus pivots the upper latch to the support portion 40.

Figure 23:
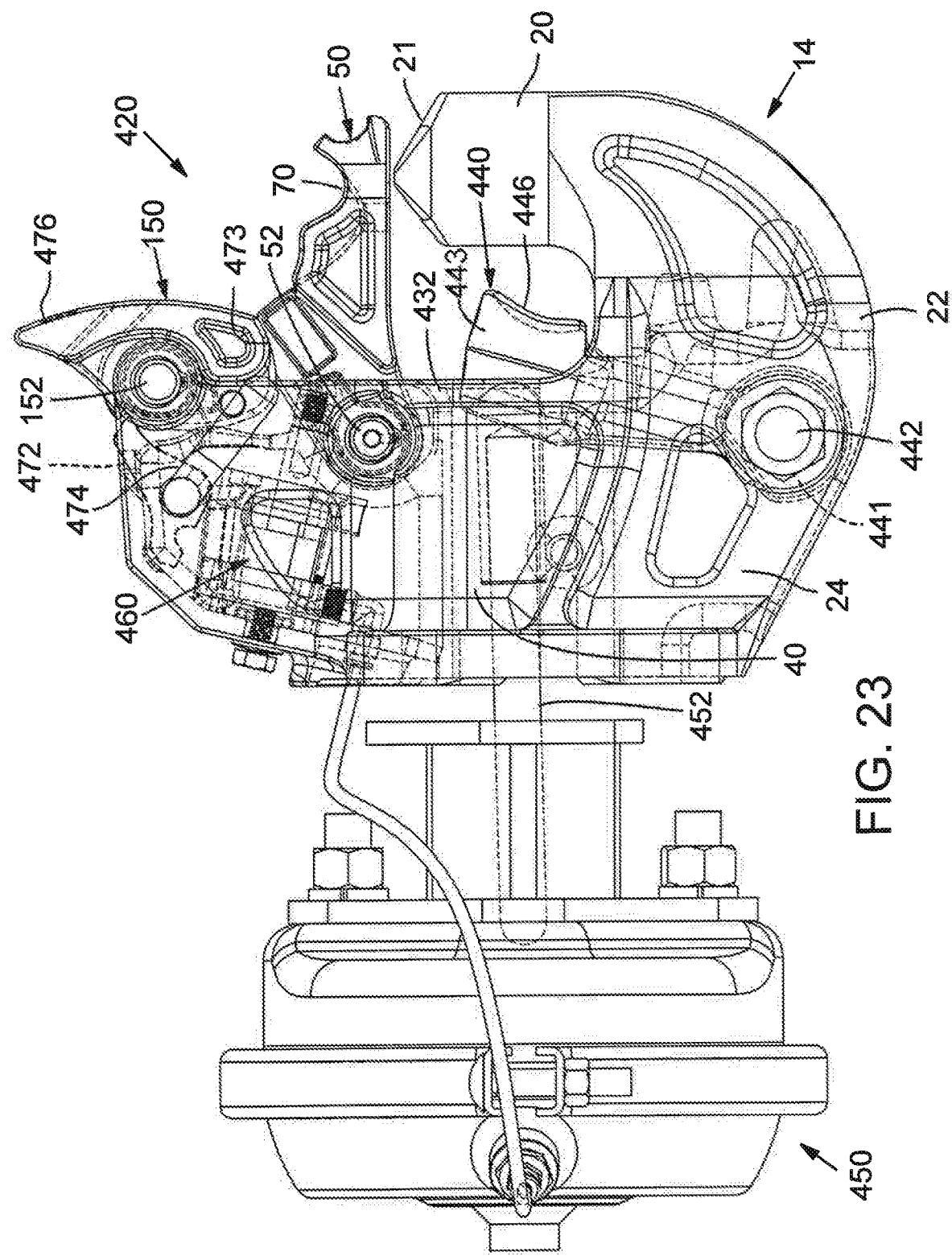
FIG. 23 is a left-side elevational view of the closed towing coupler of FIG. 20 with some of the internal components shown in dashed lines for illustration purposes.

In addition, a draw bar engaging lever 440 of this example, is pivoted to the body 12 by a pivot pin 442 for pivoting between respective clamped and unclamped positions. An exemplary clamped position is shown in FIG. 23 (although a draw bar ring if placed on the hook would limit the forward pivoting motion of the lever 440 from a maximum forward position shown in the embodiment of FIG. 23). An exemplary retracted or unclamped position of the lever 440 is shown in FIG. 24. The lever comprises a proximal end portion 441 pivoted by the pivot pin 442 to the coupler body. In this example, the lever is positioned in the cavity 434 and desirably in a lower portion of the cavity between portions of the hook. The distal end portion 443 of the lever can have a draw bar eye engaging surface 446, The surface 446 can be concave to engage a curved surface of a draw bar eye. Other towing elements of a towed vehicle can be engaged if a draw bar with a draw bar eye is not being used by the towed trailer or other vehicle. The shape of the engaging surface can be changed as desired, for example configured to conform to and engage the towing element.

The lever can be pivoted to the clamped position by an actuator in response to one or more vehicle operating conditions. These conditions can include at least one of turning on the ignition of the vehicle, starting the vehicle engine, placing the vehicle in a gear other than park or neutral, movement of the vehicle, or the release of parking brakes of the vehicle. Combinations of these conditions can be used, such as the vehicle transmission being placed in a gear other than park or neutral and a threshold vehicle speed being reached.

Although exemplary alternative actuators can be used for pivoting or otherwise moving the lever to and from a clamped position, such as explained below, a desirable form of lever actuator is a pneumatic cylinder 450 that is adapted to be coupled to the air supply line of the conventional emergency or parking brakes of a vehicle, such as a truck. The cylinder 450 can comprise a mounting bracket 451 (FIG. 25) for use in mounting the cylinder to a mounting flange 32 of the coupler.

In one known form, parking and emergency brakes of a vehicle, such as a truck, are biased by springs to a braking position to apply the brakes. Air pressure is supplied in brake air lines to compresses the brake springs and shift the parking/emergency brakes to the non-applied or non-braking state. The parking/emergency brake air lines are pressurized when the parking brakes are released. During normal operation, when the parking or emergency brakes of such a truck or other vehicle are released, an actuator, such as an air cylinder 450 (e.g. FIG. 20) adapted to be coupled to, or coupled to, the brake air supply line is pressurized. The applied air pressure causes piston inside the cylinder 450 to extend a piston rod 452. The piston rod 452 engages, and desirably the distal end of the piston rod slidably engages, the lever at a location above the pivot 442, and desirably at the distal end of the lever behind the lever engaging surface 446. As the piston rod 452 extends, the lever 440 is pivoted from the unclamped position (FIG. 20) to a clamped position (FIG. 23). Again, the position of the lever in FIG. 23 is exaggerated as a draw bar eye, when positioned on the hook 14, would limit the clockwise travel of the lever 440 in FIG. 23 due the surface 446 engaging the draw bar eye. When the emergency brakes are set, the lever is desirably biased, such as by a spring 454 (FIG. 25) coupled to the lever and to the body, to return the lever 440 to the unclamped position. The air pressure on the piston in cylinder 450 is relieved, for example by bleeding the brake air supply line or venting the cylinder when the parking brakes are set.

Figure 21:
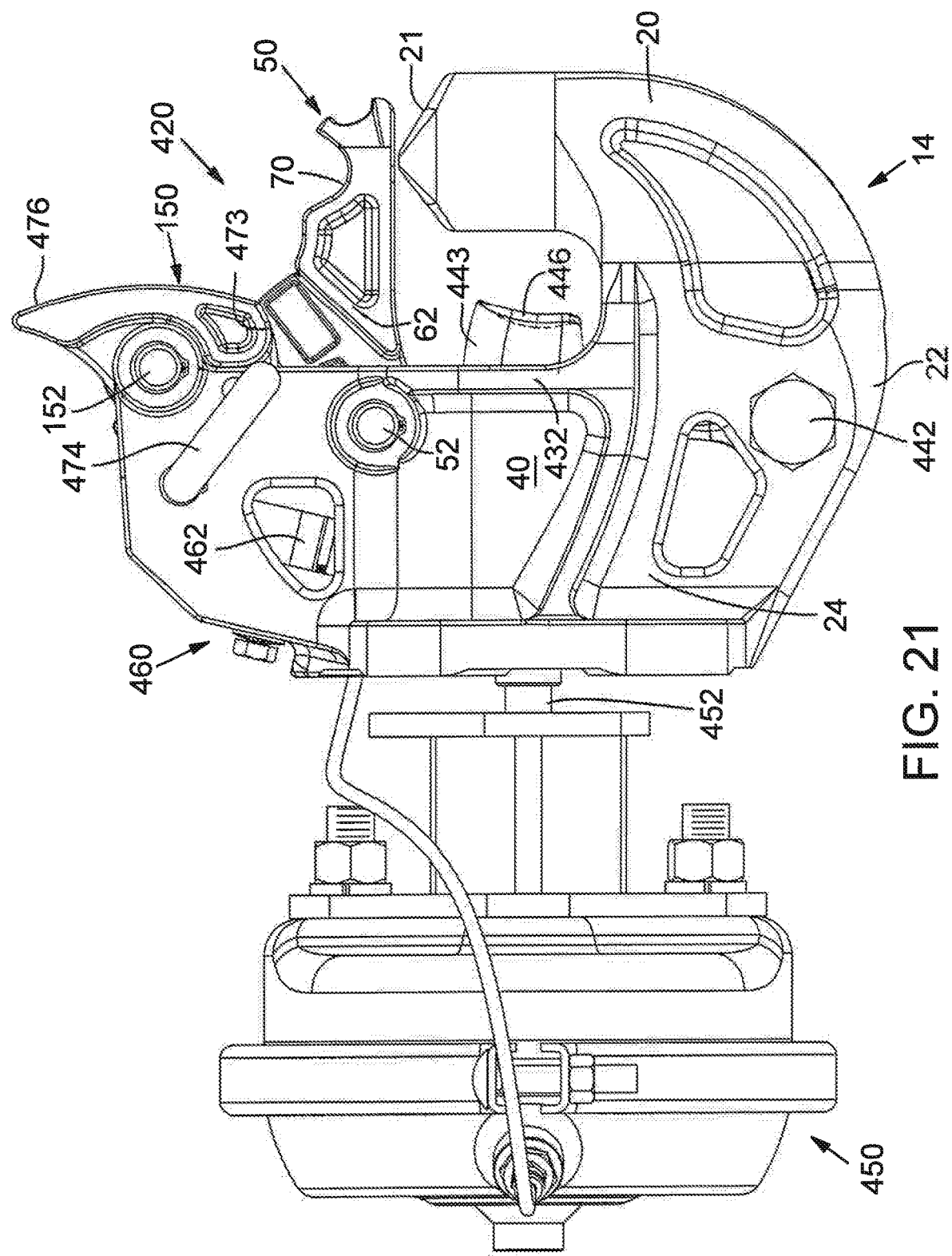
FIG. 21 is a left-side elevational view of the closed towing coupler of FIG. 20.
Figure 22:
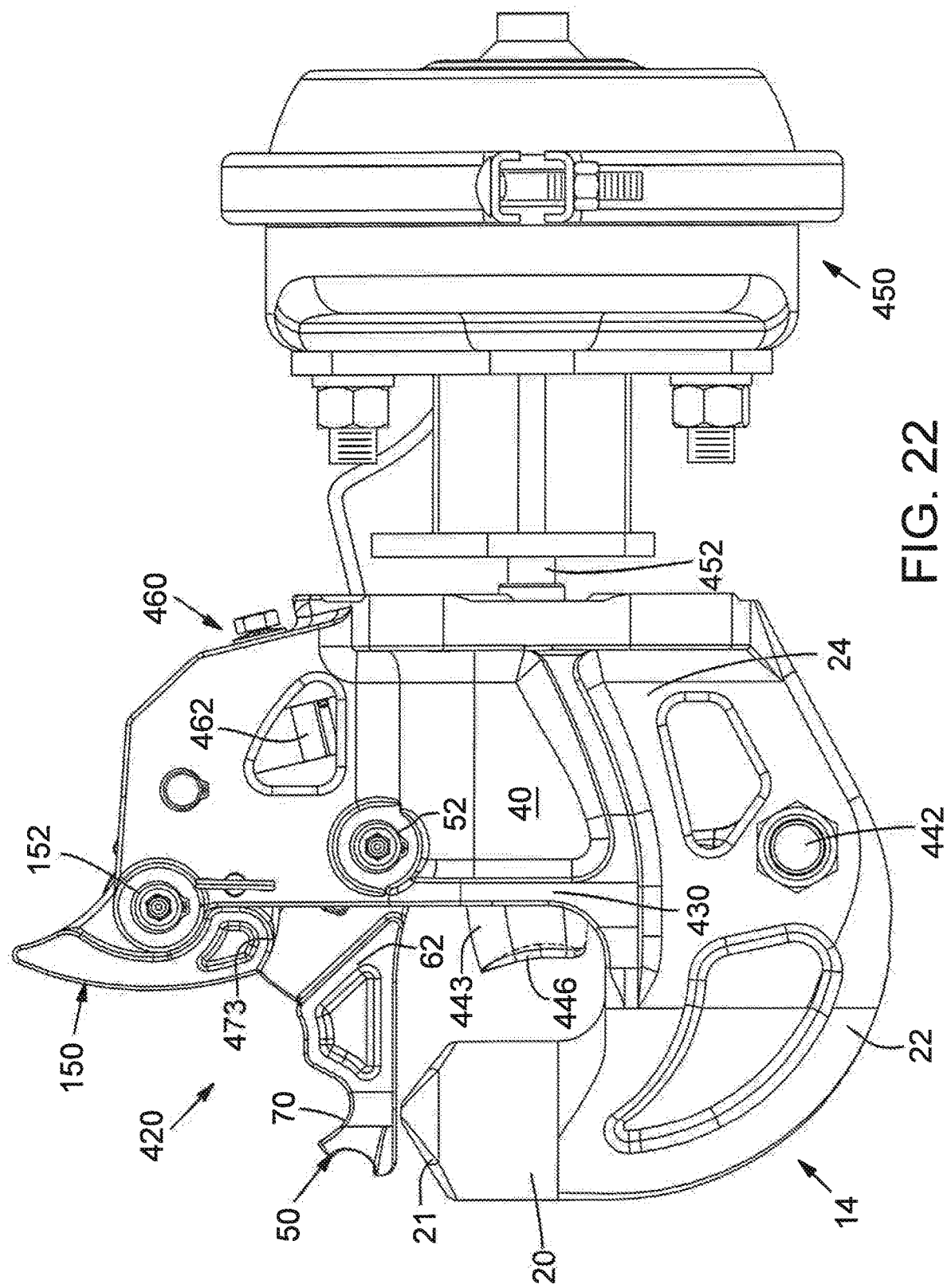
FIG. 22 is a right-side elevational view of the closed towing coupler of FIG. 20.

Ideally, drivers would move the upper and lower latches 50, and 150 to a closed position, such as shown in FIGS. 21, 22 and 23, after the draw bar eye is positioned through the hook opening and on the hook. When this happens, and the emergency brake is released, the lever 440 is moved into engagement with the draw bar eye and clamps the draw bar eye onto the hook. In addition, in a coupler having upper and lower latches 50, 150, such as described above, the latch is maintained in a closed position because of the way surfaces of the upper latch 150 bear against surfaces of the lower latch.

Figure 20:
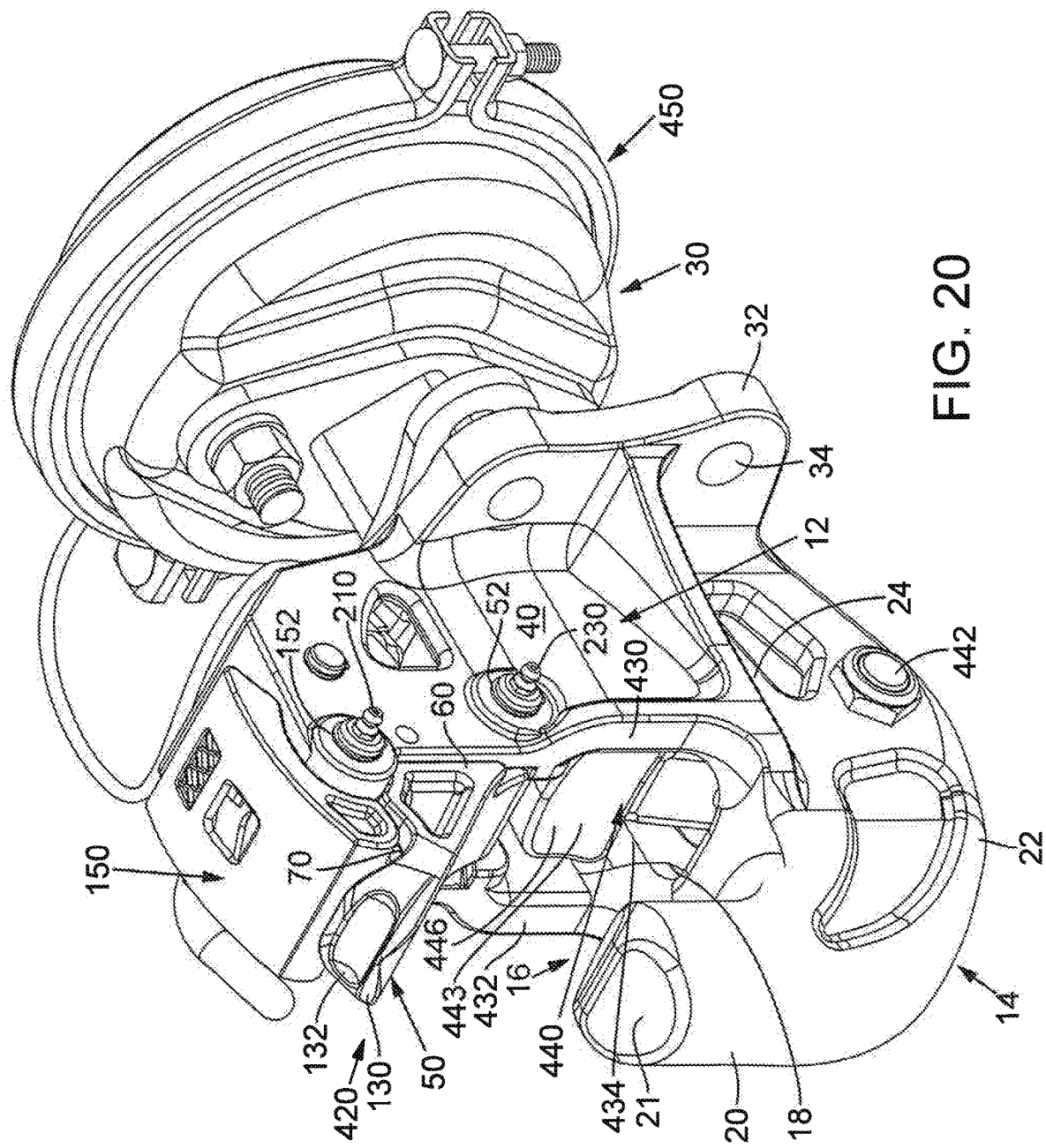
FIG. 20 is a right-side perspective view of an embodiment of a towing coupler with one form of a latch closure mechanism, the towing coupler being shown in an open state. In the embodiment of FIG. 20, a first or auxiliary cylinder is included for causing the latch to close in response to a vehicle condition. In addition, a second or primary cylinder is also included for clamping a draw bar in response to a vehicle condition.

However, if the driver happens to leave the latch in the open position shown for example in FIG. 20 after the draw bar eye is positioned on the hook, which is not uncommon, and in the absence of a latch closing actuator, such as an auxiliary actuator, upon release of the emergency brakes, the lever 440 moves to the clamped position shown in FIG. 23, but the latch elements 50, 150 would undesirably remain in the open position.

In contrast, with a latch closing actuator, such as an auxiliary actuator, such as cylinder 460 (best seen in FIG. 25), this does not happen. That is, the cylinder 460 can, for example, be a pneumatic cylinder adapted for coupling or coupled to the air supply lines for the parking brakes and to the cylinder 450. Upon release of the emergency brakes, a piston of the cylinder 460 extends a piston rod 462 of the cylinder 460 into engagement with the latch 50 and pushes the latch 50 to the closed position, shown for example in FIG. 21. The upper latch 150 is desirably biased to the closed position and thereby shifts to its closed position as the lower latch 50 is moved by the actuator to its closed position. Therefore, with this construction, it is no longer possible for the driver to release the emergency brakes and start driving without the latch being closed.

The latch actuator can also be responsive to one or more vehicle conditions. These conditions can include at least one of turning on the ignition of the vehicle, starting the vehicle engine, placing the vehicle in a gear other than park or neutral, movement of the vehicle, or the release of parking brakes of the vehicle. Combinations of these conditions can be used, such as the vehicle transmission being placed in a gear other than park or neutral and a threshold vehicle speed being reached With reference to FIG. 20, the latch can be manually operated to shift the upper and lower latches to the closed position shown in FIG. 21. That is, with reference to FIG. 20, by moving the lower latch 50 counter-clockwise in FIG. 20, the upper latch 150 is freed for movement from engaging an upwardly facing forwardly positioned surface, such as concave surface 70 (or two such surfaces 70 as shown in FIG. 25 and in some of the FIGS. 27A-G) of the lower latch. In the closed position of FIG. 21, the upper latch 150 engages the lower latch in a rearwardly positioned upwardly facing surface, such as a concave surface 473 (as shown in FIGS. 21 and 25; see also some of the FIGS. 27A-G), The lower latch 50 is moved toward the closed position (and against its bias in this example). The upper latch 150 is biased toward its closed position and moves from engaging the surface 70 into engagement with an upwardly facing closed position concave surface 473 of the lower latch 150 when the latch is closed.

When in a closed position, a pawl 472 (See, for example, FIG. 23) can engage the upper latch 150. For example, the pawl 472 can engage the latch 150 in a pawl receiving opening 475 of the upper latch. An exemplary pawl receiving opening can be seen in some of the FIGS. 28A-I). The pawl 472 retains the upper latch 150 in its closed position and thereby maintains the lower latch 50 closed as well. To permit opening of the latch, the pawl is released from engagement with the upper latch 150. For example, a pawl operating handle 474 can be coupled to the pawl. The handle 474 can be moved in a counter-clockwise direction in FIG. 21 (and away from the upper latch 150) to free the pawl from engagement with the upper latch and to thereby allow the lower and upper latches 50, 150 to be pivoted to their respective latch open positions. The pawl 472 can be biased toward an upper latch engaging position, such as by a biasing spring 477 shown in FIG. 25.

When in the lower and upper latches 50, 150 are in their closed position, a safety pin 210 (FIG. 25) can be inserted through aligned openings in the body and openings in the upper latch to hold the latches in the closed position. The safety pin can be used in addition to the pawl. The pawl and safety pin are desirable optional features.

To open the coupler from the closed position shown in FIG. 23, the safety pin 210 is removed. The pawl operating handle 474 is then rotated away from the hook 14 to move the pawl 472 away from and out of engagement with the upper latch 150. This frees the upper latch 150 for pivoting movement.

The upper end portion 476 of the upper latch 150 can be pivoted counter-clockwise (backward) in this FIG. 23 view. This frees a lower engagement surface portion or portions of the upper latch 150 from engagement with rearwardly positioned and upwardly facing concave surface 473 of the lower latch 50.

As the lower portion of the upper latch clears the rearwardly positioned upwardly facing concave surface 473 of the lower latch, the lower latch 50 is biased toward and moves to its open position. In addition, the upper latch 150, which in this example is biased to its closed position, moves into engagement with the forward surface (in this example surfaces 70) of the lower latch. The latch is now open such that a trailer draw eye bar can be positioned through the hook receiving opening to a position below the lower latch and onto the hook portion 14 of the coupler body.

To close the latch manually, the user can pull the front portion 130 of the lower latch downwardly toward its closed position, which frees the upper latch to pivot to the closed position due to the biasing of the upper latch.

Assume for purposes of an example, that a coupler closer is included in the embodiment and is operable in response to releasing the emergency brakes of the vehicle. For example, the coupler closer can comprise the pneumatic cylinder 460 coupled to the air supply line for the vehicle emergency or parking brakes. In addition, the coupler can comprise a clamping lever with an actuating pneumatic cylinder that is also coupled to the air supply line for the parking brakes. When the parking brakes are released, a piston rod of the cylinder 450 is operated to push the clamping lever to a clamped position and against the draw bar eye positioned on the hook portion. Also, upon release of the parking brakes, or the occurrence of one of more other vehicle operating conditions, a piston of the cylinder 460 is operated to push the lower latch 50 to the closed position with the upper latch 150 being biased to its closed position as the lower latch is moved to the closed position.

Desirably this operation of the latch to a closed position in response to one or more vehicle operating conditions occurs automatically. It is also possible, though less desirable, to delay the shifting of the latch to the closed position in response to one or more vehicle operating conditions or to require another step or action to first occur. However, the automatic operation of the latch to the closed position, such as in response to releasing the parking brakes, the inadvertent failure by a driver to close the latch is addressed.

Figure 29:
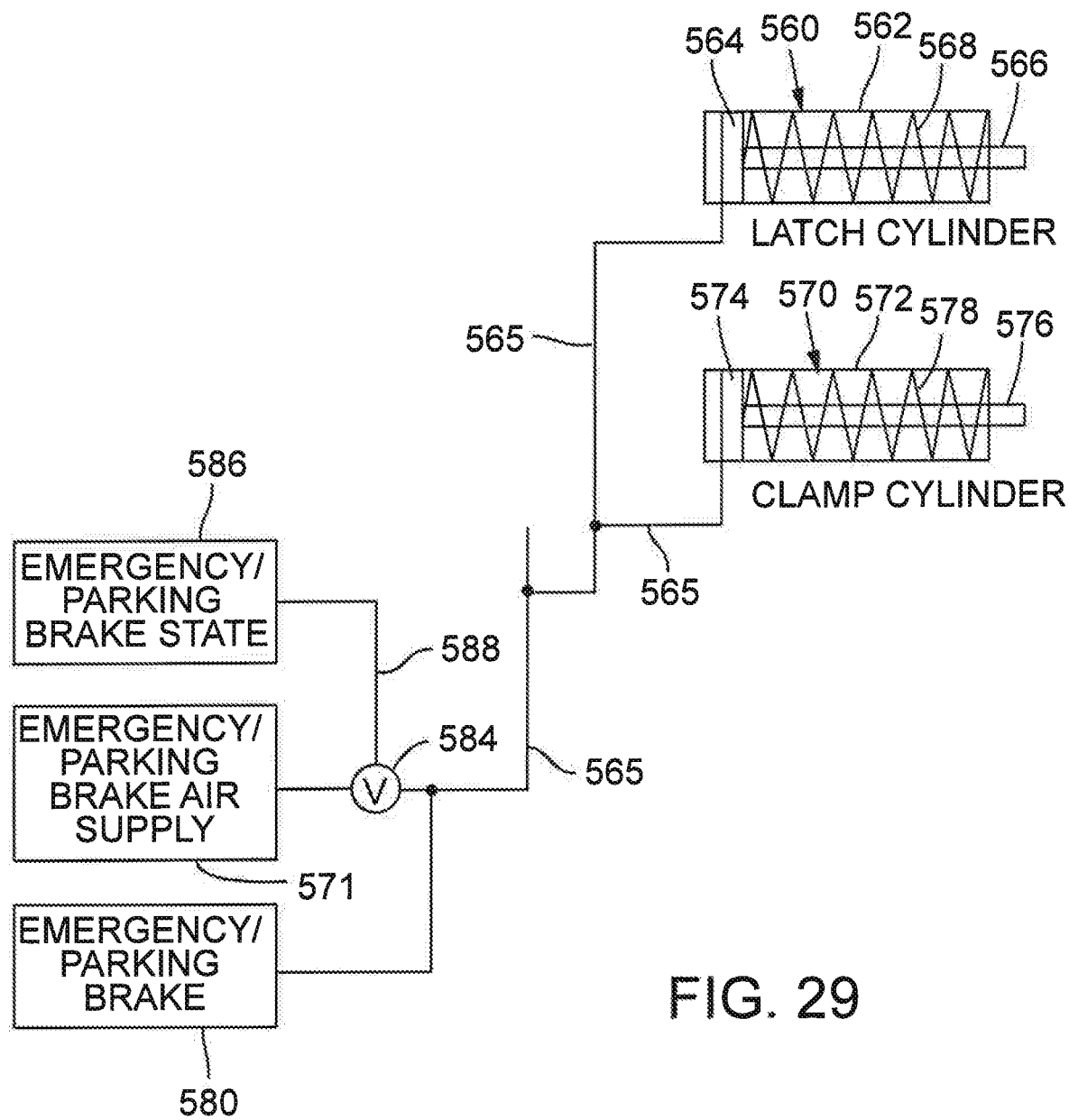
FIG. 29 illustrates an exemplary control system for an embodiment with first and second actuators for respectively closing a latch that closes a hook opening and moving a clamp into engagement with a tow bar of a vehicle.

FIG. 29 illustrates an exemplary control system for an embodiment with first and second actuators for respectively closing a latch that closes a hook opening and moving a clamp into engagement with a tow bar of a vehicle. In the embodiment of FIG. 29, the first or auxiliary actuator comprises a latch or auxiliary cylinder 560 having a housing 562 with a piston 564 therein. The piston 564 comprises a projecting piston rod 566. The piston rod 566 is biased by a spring 568 to a position that retracts the piston rod 566 further into the housing. When the piston rod is extended by pressurizing the piston, in this example by delivering pressurized air to the left side of the piston 564 in FIG. 29, the piston rod 566 moves a latch member engaged by the piston rod to cause the latch to pivot to a position closing the hook opening as previously described. In the example of FIG. 29, the cylinder 560 is coupled by an air line 565 in this example to the emergency brake/parking brake air supply.

In the example of FIG. 29, the second or clamping actuator also can comprises a clamp or primary cylinder 570 having a housing 572 with a piston 574 therein. The piston 574 comprises a projecting piston rod 576. The piston rod 576 is biased by a spring 578 to a position that retracts the piston rod 576 further into the housing. When the piston rod is extended by pressurizing the piston, in this example by delivering pressurized air to the left side of the piston 574 in FIG. 29, the piston rod 576 moves a clamp member, such as a lever, engaged by the piston rod 576 to cause the lever to pivot to a position engaging or clamping the lever against a tow bar ring placed through the hook opening and onto the hook as previously described. In the example of FIG. 29, the cylinder 570 is coupled by the air line 565 to the emergency brake/parking brake air supply.

In conventional emergency/parking brakes for trucks that tow trailers, the emergency and parking brakes are typically biased to a braking position. For example, they may have springs that will force the brakes to a braking position in the absence of pressurized air that compresses the springs and releases the brakes. In FIG. 29, the parking brakes and emergency brakes are indicated schematically by the number 580. When the brakes are released, a source of pressurized air, indicated by emergency/parking brake air supply 571, is coupled to the emergency brakes to release them from their braking position. In FIG. 29, a valve 584 is shown and is operated to close off the air supply when the parking brakes are set. Vehicles have sensors for determining the state of the parking brakes. Emergency brakes are normally set when the air supply fails. As shown in FIG. 29, the parking brake state is determined, as indicated schematically by block 586, from an emergency brake position or state sensor. In response, a control signal is sent via a line 588 to the valve 584 and causes the valve to open. For example, valve 584 can be a solenoid operated valve that opens and closes in response to electrical signals on line 588 (e.g. in response to the presence or absence of a signal. The valve 584 is open in this example when the parking brakes are released. In this valve state, the pressurized air from air supply 580 is delivered not only to the vehicle parking brakes, but also via line 565 to the respective cylinders 560, 570 to cause the extension of the respective rods 566 and 576 to thereby close the latch and clamp the lever against the tow bar ring. When the emergency brakes are again set, the valve 584 closes and air is bled from line 565 (and from the left side of the pistons 564, 574 in FIG. 29) and allows the springs 568, 578 to return the piston rods 566, 576 of the cylinders 560 and 570 to their respective retracted positions illustrated in FIG. 29. The cylinders can be configured in other ways to cause the desired closing of the hook opening and clamping of the tow bar in response to the pressurized air. For example, although more complex, the piston rods can be coupled to the respective latch and lever, by, for example, links that move these members in desired manner upon retraction of the piston rods.

Figure 30:
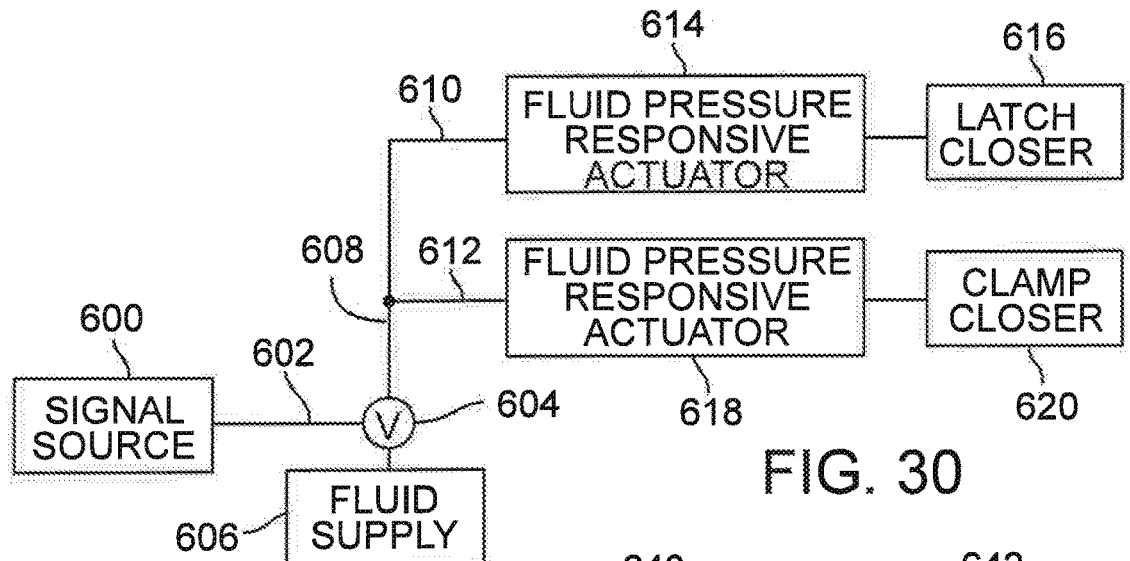
FIG. 30 provides a more general example of exemplary actuators accomplishing latch closing and clamp closing.

FIG. 30 provides a more general example of exemplary actuators accomplishing latch closing and clamp closing. For example, the actuators 614 and 618 in FIG. 30 can be the pneumatic cylinders 560, 570 of FIG. 29 with the latch closer being a latch moved by the piston rod 566 and the clamp closer being the lever moved by the piston rod 576.

However, more generally, in the example of FIG. 30 a signal source 600 is shown, which can provide a signal indicating that the parking brakes have been released. Alternatively, the signal source can provide one or more other signals corresponding to other conditions or combinations of conditions in addition to or instead of the release of the parking brakes. For example, the signals can correspond to one or more of: (a) the transmission of the vehicle being placed into a gear other than park/neutral; (b) a change in the vehicles initial velocity (for example a velocity change such as a change above or from zero, or when the vehicle velocity has reached or exceeded a threshold value, which may be a predetermined value, with five miles per hour being one specific example; (c) the vehicle ignition being turned on, (this may be a less desirable option as a driver may want to leave his vehicle running while a trailer is being connected to the vehicle); and/or (d) the detection of the initial accelerator depression. These signals are examples of vehicle signals available in the event of one or more changes in vehicle conditions occur relating to starting the vehicle, the vehicle changing from a static position to dynamic position, or the vehicle changing from a condition when parked to a driving condition. These signals are available on conventional trucks with corresponding signals typically being sent along one or more electrical busses found on such vehicles.

In a response to one or more of these triggering or actuation signals from signal source 600, a control signal is generated along a line 602. For example, a control signal along line 602 can be an electrical signal suitable for changing the state of a valve 604 from a closed to an open position. The valve can be controlled by mechanical links or pneumatic signals generated in response to the actuation signals, depending upon the mode of controlling the valve 604.

In FIG. 30, a fluid supply 606 is also indicated. The fluid can be air as explained above in connection with FIG. 29. As another option, the fluid can be pressurized hydraulic fluid. The valve 604 is coupled by a line 608 to respective lines 610 and 612. The line 610 is coupled to a fluid pressure responsive actuator 614. The fluid responsive actuator 614 can be a pneumatic cylinder as previously described. As another example, the fluid pressure responsive actuator 614 can comprise a hydraulic motor or hydraulic piston. The actuator 614 is coupled to the latch closer 616, such as the piston rod 566 described above in FIG. 29. Alternatively, the latch closer can be another mechanism for imparting motion to a latch which closes the hook opening of the coupler. For example, the latch closer can be a screw jack, a pneumatic piston, a hydraulic piston, a bellows, or other mechanism that pivots the latch to a closed position.

A similar actuator 618 can be provided and coupled to a clamp closer 620. The actuator 618 can be the same as the actuator 614. In addition, the clamp closer 620 can be the same as the exemplary latch closers 616 described above. Alternatively, a different form of actuator can be used for the actuator 614 and the actuator 618 as they need not be the same. In the case of a hydraulic fluid supply example, a return line (not shown) can be provided to return hydraulic fluid to the fluid supply 606 upon closing of the valve 604 and the relief of pressure in the lines 610, 612. In the case of a pneumatic fluid supply, typically, the pressure is relieved by simply bleeding the lines when the valve is closed.

Figure 31:
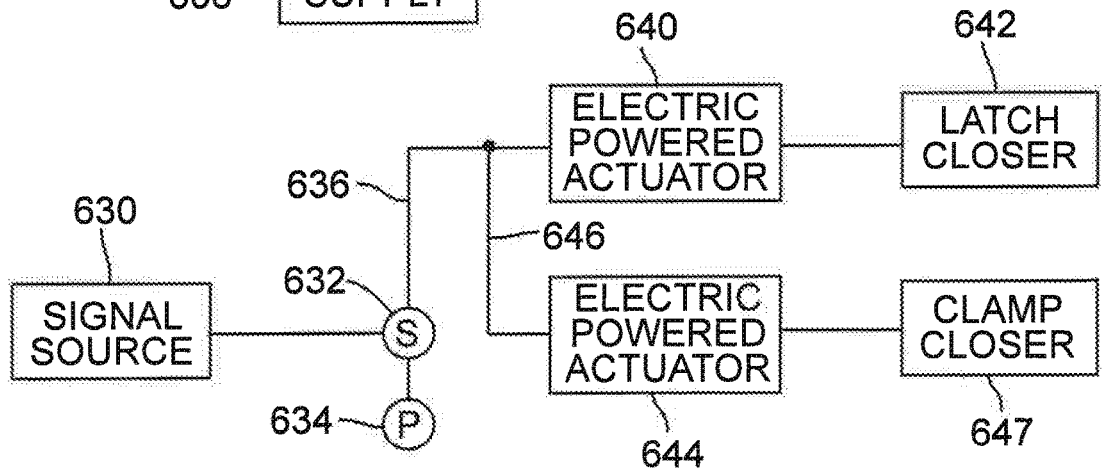
FIG. 31 illustrates another example of an actuator control system that can be used to accomplish latch closing and clamp closing.

FIG. 31 illustrates another example of an actuator control system. In FIG. 31, the signal source 630 can be the same as signal source 600 and the triggering signals can be one or more of the signals as described above. In the example of FIG. 31, in response to a triggering or actuation signal from the signal source, a switch 632 is closed to couple electrical power from a source 634 to pas via conductors 636 to an electric powered actuator 640 coupled to the latch closer 642. In this example, the electric powered actuator can comprise an electric motor, an electrically operated jack, or other electric powered mechanism that generates the required motion, such as linear motion, that causes the latch closer 642 to close the latch. As a specific example, the electric powered actuator can comprise a solenoid actuated plunger with the plunger being coupled to the latch for closing the latch, much like the above described pneumatically actuated piston rod.

A second electric powered actuator 644 is coupled via a line 646 to the line 636 for receiving electrical power and in response thereto operating a clamp closer 647. The clamp closer, can comprise a lever, with the electric powered actuator 644 being coupled by the clamp closer to the lever. The actuator 644 can be the same as the actuator 640. Alternatively, different actuators can be used for the actuators 640 and 644.

Figure 32:
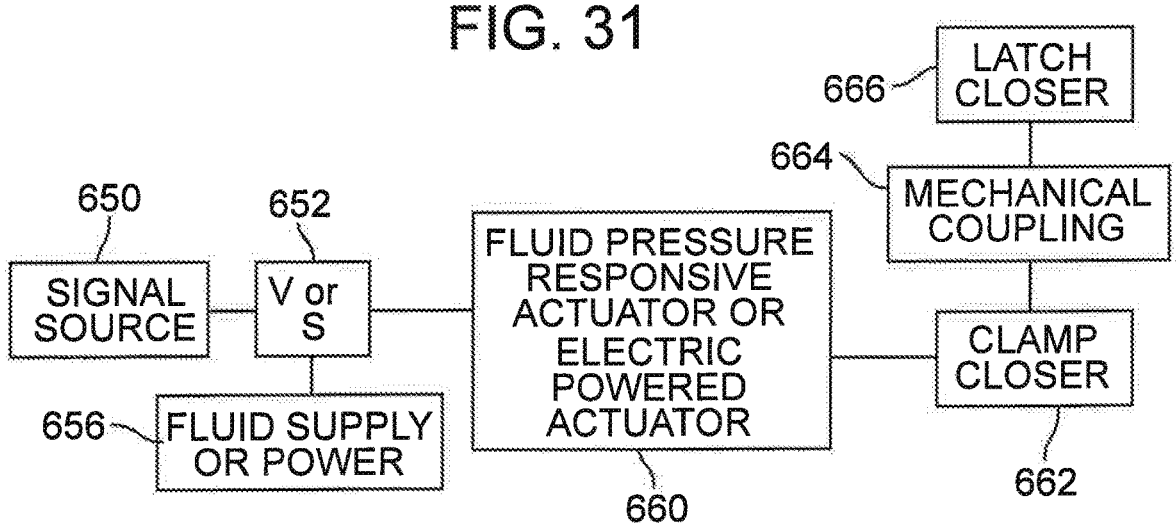
FIG. 32 illustrates an example of an actuator control system in which one actuator and a mechanical coupling is used to cause both a latch to close and a draw bar to be clamped.

In the example of FIG. 32, a control signal source 650 is shown. The signal source 650 can provide actuation signals as described above and can be like the sources 600, 630. Signal source 650 is coupled to a valve or switch 652 (such as valve 604 and switch 632 described above). The valve is coupled to a fluid supply or power supply 656 and, in response to one or more actuation signals, controls the flow of power or pressurized fluid as needed to an actuator 660 (which can be a fluid pressure responsive actuator or an electrical power responsive actuator) such as described for actuators 618, 644, supply or power to the actuators. The actuator 660 controls a clamp closer, operable as previously described, to clamp a tow bar positioned on the hook. In FIG. 32, a mechanical coupling or link 664 couples a latch closer 666 (such as described above) to the clamp closer. The latch closer 666 can, for example, be a rod that is rotatable or slidable between a closed and open positions; the closed position corresponding to a position in which the latch closer causes the latch to close the hook opening and the open position corresponding to the latch being moved to an open position. The mechanical coupling can be a link coupled from a clamp closer (such as from a piston rod coupled to a clamping lever or to the clamping lever) such that movement of the clamp closer to a clamping position causes the latch closer move to move the latch to the closed position.

Figure 33:
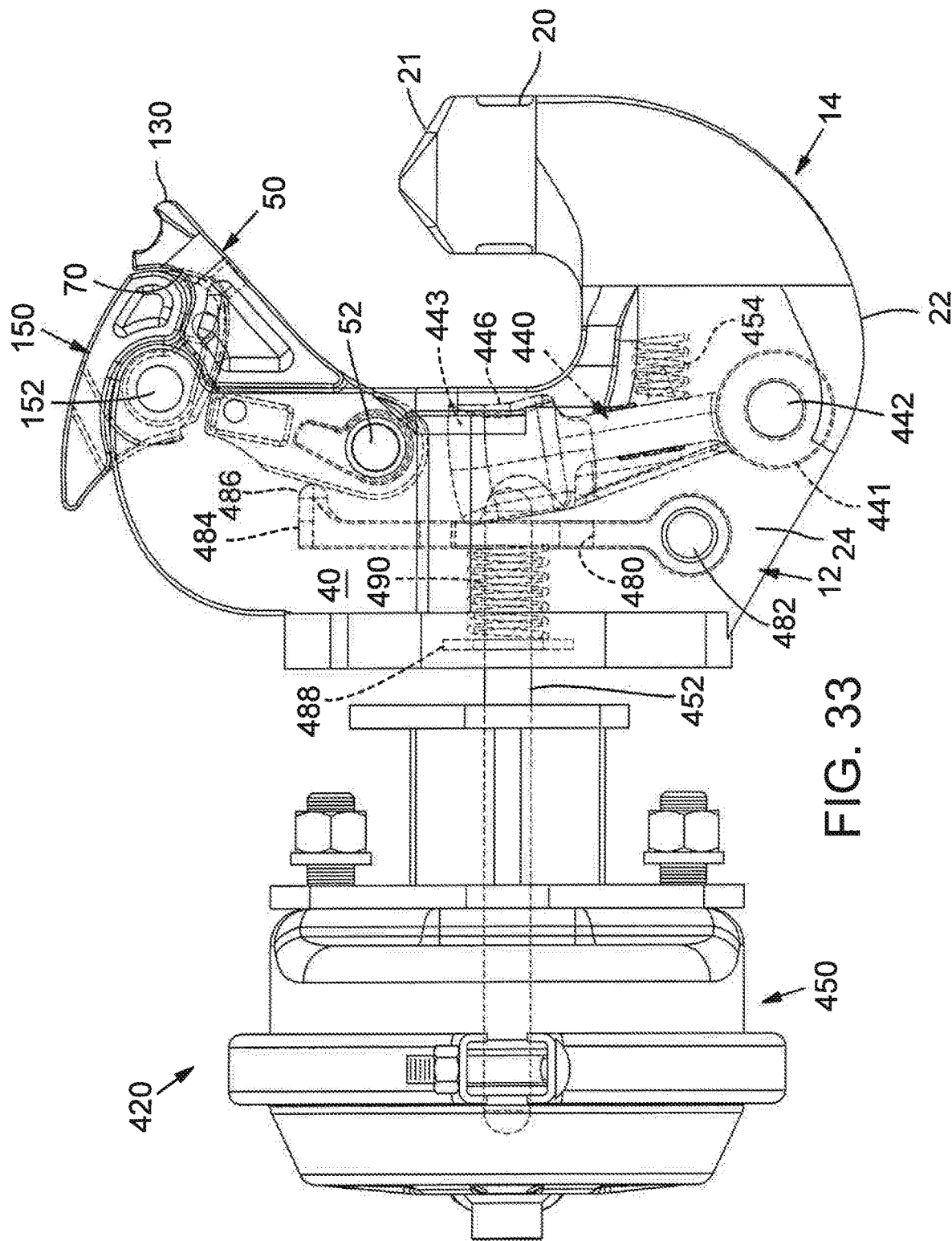
FIG. 33 illustrates a first embodiment of a mechanical coupling between a single clamping cylinder and a latch with the latch shown in an open position.
Figure 34:
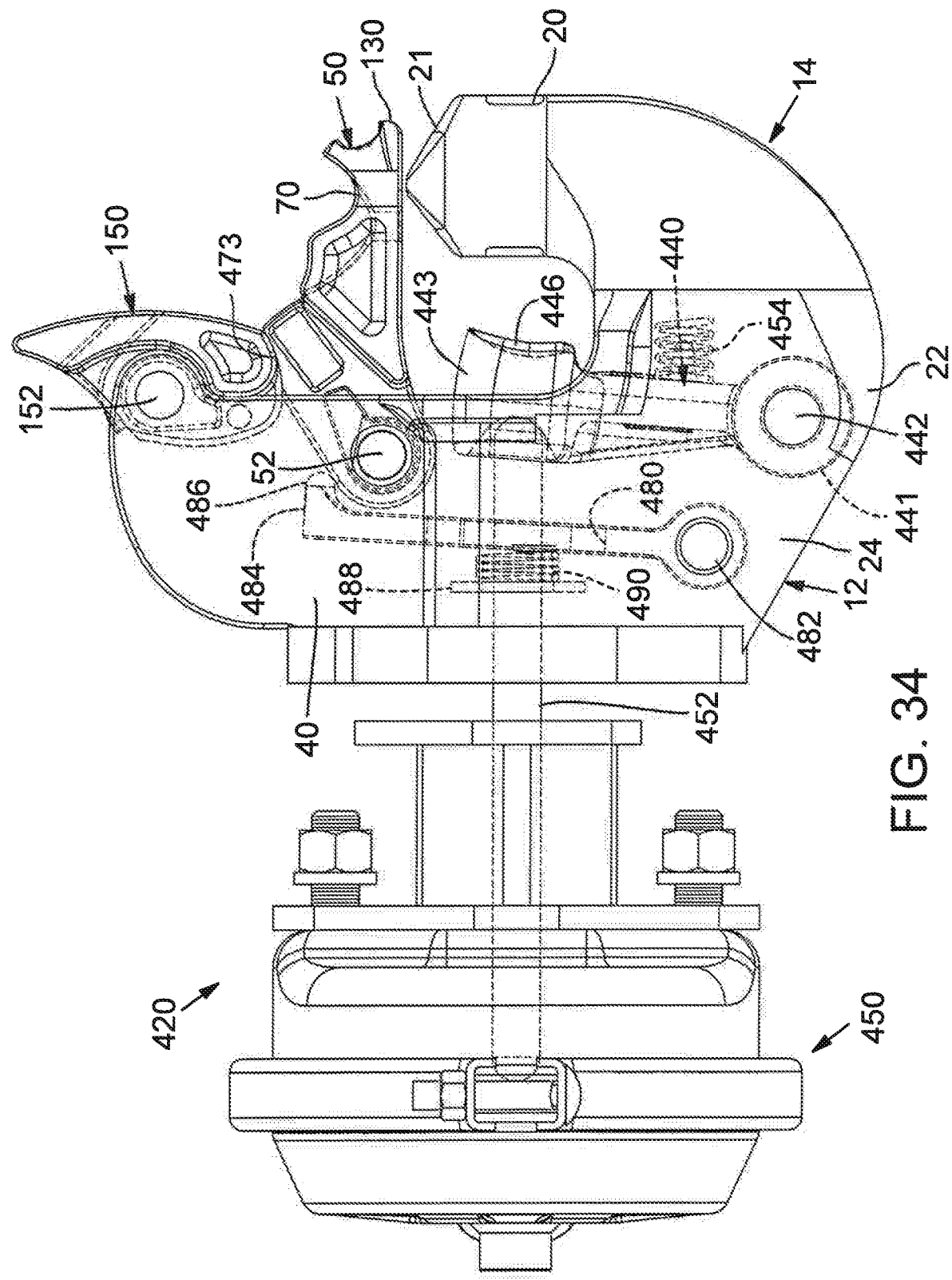
FIG. 34 illustrates the embodiment of FIG. 33 with the latch shown in a closed position.

FIGS. 33 and 34 illustrate an example of the coupler closer comprising a mechanical link that is operated to close the latch in response to one or more vehicle operating conditions. In this example, the mechanical link couples the clamping actuator to the lower latch 50 and pivots the lower latch 50 to the lower latch closed position (which results in closing the upper latch 150 as explained above) in response to movement of the clamping lever 440 to a clamped position.

In this example, the mechanical link is shown in the form of a lever 480 that is pivoted to the body 12 for pivoting about a pivot axis 482. The link is coupled to the first latch 50. In this example, the proximal end of the lever 480 is pivoted to the body and the distal end 484 of the lever comprises a latch engagement projection 486 coupled to, and in this example slidably engaging, a rear surface of the latch 50. The above described piston rods 452, 462, also desirably slidably engage the associated respective clamping lever 440 and latch 150 and can comprising an intervening engagement element such as a wear element. The mechanical link is pivotal between first and second positions shown respectively in FIGS. 33 and 34. In this example, the piston rod 452 passes through an opening through the mechanical link and into engagement with the lever 440. A stop 488 is mounted to the piston rod 452 and a spring 490 is positioned on the piston rod 452 and between the stop and the link. In the first latch open position shown in FIG. 33, the spring is uncompressed. Upon moving the piston rod 452 to shift the lever 440 to the clamped position, the spring 490 is compressed and causes the distal end of the link to push against the latch 50 and move the latch 50 to the closed position.

Although these various mechanisms can be used, the most desirable and simplest mechanism is simply to supply pneumatic pistons used to close the clamp and the latch from the parking brake air supply as described above in connection with FIG. 29.

It should be noted that the latch closing actuator can be utilized advantageously to cause the latch to close in applications where there is no clamping lever or other tow bar clamp being used. In such examples, a desirable form of latch includes upper and lower latches or latch members.

Having illustrated and described the principles of my invention with reference to a number of embodiments, it should be apparent to those of ordinary skill in the art that the disclosed couplers can be modified in arrangement and detail without departing from the inventive principles and features disclosed herein. The disclosure is not limited to these embodiments and includes all novel and non-obvious combinations and sub-combinations of elements disclosed herein and related methods. I claim all such modifications as fall within the scope of the claims.

The invention claimed is:

1. A towing coupler for a vehicle, comprising:
   a body comprising a hook portion having a hook opening and a latch supporting portion;
   a first latch coupled to the latch supporting portion and pivotal about a latch pivot axis between first latch open and first latch closed positions, whereby in the first latch closed position a draw bar eye is blocked from passage through the hook opening and whereby in the first latch open position passage of a draw bar eye through the hook opening is not blocked,
   the first latch comprising upwardly facing first and second latch engaging surfaces, the first latch engaging surface being spaced further from the first latch pivot axis than the second latch engaging surface;
   a first spring coupled to the body and to the first latch and biasing the first latch to pivot about the first latch pivot axis in a first direction and away from the first latch closed position;
   a second latch pivoted to the latch supporting portion and pivotal about a second latch pivot axis, the second latch being pivotal about the second latch pivot axis between a second latch first position and a second latch second position, wherein in the second latch first position and with the first latch in the first latch open position, the second latch is coupled at least partially to the first latch engaging surface, and wherein in the second latch second position and with the first latch in the first latch closed position, the second latch is coupled at least partially to the second latch engaging surface;
   a second spring coupled to the body and to the second latch and biasing the second latch to pivot about the second latch pivot axis in a second direction opposite to the first direction, the second spring pivoting the second latch to the second latch second position upon pivoting of the first latch from the first latch open position toward the first latch closed position;
   an actuator coupled to the first latch and operable to cause the first latch to pivot to the closed position in response to one or more vehicle conditions, wherein the actuator comprises a cylinder comprising a piston with a piston rod, the piston rod being coupled to at least the first latch, the cylinder being operated in response to the one or more vehicle conditions to cause the piston rod to pivot the first latch to the first latch closed position in response to the occurrence of the one or more vehicle conditions,
   wherein the one or more vehicle conditions include at least one of turning on the ignition of the vehicle, starting an engine of the vehicle, placing the vehicle in a gear other than park or neutral, movement of the vehicle, or the release of parking brakes of the vehicle.

2. A towing coupler for a vehicle according to claim 1 wherein the cylinder comprises a pneumatic cylinder that is adapted for coupling to an air supply line for the parking brakes of the vehicle, the cylinder being pressurized to extend the piston to pivot the at least one latch to the latch closed position in response to the release of the parking brakes.

3. A towing coupler according to claim 1 comprising a pawl pivoted to the body and coupled to the second latch and adapted to engage and retain the second latch in the second latch second position while the first latch is in the first latch closed position and until the first latch is pivoted to the first latch open position.

4. A towing coupler according to claim 1 wherein the piston rod pivots the first latch to the first latch closed position in response to releasing of the parking brakes.

5. A towing coupler according to claim 1 comprising a lever pivoted to the body and positioned for pivoting between clamped and unclamped positions, whereby in the clamped position the lever is adapted for engaging a draw bar eye positioned on the hook portion and in the unclamped position the lever is adapted to disengage the draw bar eye positioned on the hook portion;
   a spring biasing the lever to the unclamped position;
   wherein the piston rod is coupled to the lever and is adapted to pivot the lever to the clamped position in response to the occurrence of the one or more vehicle conditions;
   a mechanical link pivoted to the body and coupled to the first latch, the mechanical link being pivotal between first and second link positions, a spring biasing the mechanical link to the second link position, the mechanical link being coupled to the first latch to pivot the first latch to the first latch closed position upon pivoting the mechanical link to the first link position, the piston being coupled to the mechanical link and pivoting the mechanical link to the first link position to thereby pivot the first latch to the first latch closed position upon pivoting the lever by the piston to the clamped position.

6. A towing coupler according to claim 5 wherein the one or more vehicle conditions is the release of the parking brakes and wherein the cylinder is a pneumatic cylinder.

7. A towing coupler for a vehicle according to claim 1 wherein the cylinder comprises a first or auxiliary cylinder, the piston comprises a first piston, and the piston rod comprises a first piston rod, and wherein the towing coupler further comprises:
   a lever pivoted to the body and positioned for pivoting movement between clamped and unclamped positions, whereby in the clamped position the lever is adapted for coupling to a draw bar eye positioned on the hook portion and in the unclamped position the lever is decoupled from a draw bar eye positioned on the hook portion;
   a second cylinder comprising a second piston and second piston rod, the second piston rod being coupled to the lever to pivot the lever to the clamped position in response to the occurrence of the one or more vehicle conditions.

8. A towing coupler according to claim 7 wherein each of the first and second cylinders comprise pneumatic cylinders adapted for coupling to an air supply line for parking brakes of the vehicle, the one or more vehicle conditions comprising the release of the vehicle parking brakes.

9. A towing coupler for a vehicle according to claim 1:
wherein the actuator comprises first and second actuators:
wherein the first actuator is coupled to the at least one latch and is adapted to pivot the at least one latch to the closed position in response to the one or more vehicle conditions;
a lever pivoted to the body and positioned for pivoting movement between clamped and unclamped positions, whereby in the clamped position the lever is adapted for coupling to a draw bar eye positioned on the hook portion and in the unclamped position the lever is decoupled from a draw bar eye positioned on the hook portion;
wherein the second actuator is coupled to the lever and adapted to pivot the lever to the clamped position in response to the one or more vehicle conditions.

10. A towing coupler according to claim 9 wherein the at least one vehicle condition is the release of parking brakes of the vehicle, the first and second actuators comprising respective first and second pneumatic cylinders, the first cylinder having a first piston coupled to the at least one latch and adapted for coupling to an air supply line for the parking brakes of the vehicle, the first piston rod being extended to pivot the latch to the latch closed position in response to a release of the parking brakes, the second cylinder having a second piston coupled to lever and adapted for coupling to the air supply line for the parking brakes of the vehicle, the second piston rod being extended to pivot the lever to the clamped position in response to the release of the parking brakes of the vehicle.

11. A towing coupler for a vehicle comprising:
a body comprising a hook portion having a hook opening and a latch supporting portion;
a first latch pivoted to the latch supporting portion and pivotal about a first latch pivot axis between first latch open and first latch closed positions, the first latch comprising first and second latch engaging surfaces;
a first spring coupled to the body and to the first latch and biasing the first latch to pivot about the first latch pivot axis in a first direction and away from the first latch closed position;
a second latch pivoted to the latch supporting portion and pivotal about a second latch pivot axis, the second latch being pivotal about the second latch pivot axis between a second latch first position and a second latch second position, wherein in the second latch first position and with the first latch in the first latch open position, the second latch is coupled at least partially to the first latch engaging surface, and wherein in the second latch second position and with the first latch in the first latch closed position, the second latch is coupled at least partially to the second latch engaging surface;
a second spring coupled to the body and to the second latch and biasing the second latch to pivot about the second latch pivot axis in a second direction opposite to the first direction, the second spring pivoting the second latch to the second latch second position upon pivoting of the first latch from the first latch open position toward the first latch closed position;
a cylinder adapted to respond to the release of the parking brakes of the vehicle, the cylinder comprising a piston with a piston rod, the piston rod being coupled to the first latch, the piston rod extending in response to the release of the parking brakes to pivot the first latch to the first latch closed position.

12. A towing coupler according to claim 11 wherein the cylinder is adapted for coupling to a parking brake air supply line of the vehicle that is pressurized upon release of the parking brakes, the piston extending in response to pressurization of the parking brake air supply line, the cylinder further comprising a return spring biasing the piston from the extended position to a retracted position and causing the piston to travel to the retracted position upon the relief of pressure in the parking brake supply line.

13. A towing coupler according to claim 11 comprising a pawl pivoted to the body and coupled to the second latch and adapted to engage and retain the second latch in the second latch second position while the first latch is in the first latch closed position and until the first latch is pivoted to the first latch open position.

14. A towing coupler according to claim 13 wherein the first cylinder is adapted for coupling to a parking brake air supply line of the vehicle that is pressurized upon release of the parking brakes, the first piston extending in response to pressurization of the parking brake air supply line, the first cylinder further comprising a first return spring biasing the first piston from the extended position to a retracted position and causing the first piston to travel to the retracted position upon the relief of pressure in the parking brake supply line; and
wherein the second cylinder is adapted for coupling to a parking brake air supply line of the vehicle that is pressurized upon release of the parking brakes, the second piston extending in response to pressurization of the parking brake air supply line, the second cylinder further comprising a second return spring biasing the second piston from the extended position to a retracted position and causing the second piston to travel to the retracted position upon the relief of pressure in the parking brake supply line.

15. A towing coupler according to claim 11 wherein:
the cylinder comprises a first or auxiliary cylinder, the piston comprising a first piston and the piston rod comprising a first piston rod;
a second or clamping cylinder comprising a second piston with a second piston and a second piston rod;
a lever pivoted to the body and positioned for pivoting movement between clamped and unclamped positions;
the first cylinder adapted to respond to the release of the parking brakes of the vehicle, the first piston rod extending in response to the release of the parking brakes to pivot the first latch to the first latch closed position; and
the second cylinder adapted to respond to the release of the parking brakes of the vehicle, the second piston rod extending in response to the release of the parking brakes to pivot the lever to the clamped position.

16. A towing coupler according to claim 15 comprising a pawl pivoted to the body and coupled to the second latch and adapted to engage and retain the second latch in the second latch second position while the first latch is in the first latch closed position and until the first latch is pivoted to the first latch open position.

17. A towing coupler for a vehicle comprising:
a body comprising a hook portion having a hook opening and a latch supporting portion;
a latch pivoted to the body and pivotal between latch open and latch closed positions; and
means for pivoting the latch to the latch closed position in response to one or more vehicle conditions,
wherein the means for clamping is operable to clamp a draw bar eye on the hook portion and
wherein the one or more vehicle conditions comprises releasing an emergency brake of the vehicle.

18. A towing coupler for a vehicle comprising:
a body comprising a hook portion having a hook opening and a latch supporting portion;
at least one latch coupled to the latch supporting portion and pivotal about a latch pivot axis between latch open and latch closed positions, whereby in the latch closed position a draw bar eye is blocked from passage through the hook opening and whereby in the latch open position passage of a draw bar eye through the hook opening is not blocked; and
an actuator coupled to the at least one latch and operable to cause the at least one latch to pivot to the closed position in response to one or more vehicle conditions,
wherein the one or more vehicle conditions comprises releasing an emergency brake of the vehicle.

* * * * *